United States Patent
Hirata et al.

(10) Patent No.: US 11,529,769 B2
(45) Date of Patent: Dec. 20, 2022

(54) FIBER REINFORCED THERMOPLASTIC RESIN MOLDED ARTICLE AND FIBER REINFORCED THERMOPLASTIC RESIN MOLDING MATERIAL

(71) Applicant: Toray Industries, Inc., Tokyo (JP)

(72) Inventors: Shin Hirata, Nagoya (JP); Yuki Nitsutsuji, Nagoya (JP); Atsuki Tsuchiya, Nagoya (JP)

(73) Assignee: Toray Industries, Inc., Tokyo (JP)

( * ) Notice: Subject to any disclaimer, the term of this patent is extended or adjusted under 35 U.S.C. 154(b) by 510 days.

(21) Appl. No.: 16/619,129

(22) PCT Filed: Jul. 30, 2018

(86) PCT No.: PCT/JP2018/028449
§ 371 (c)(1),
(2) Date: Dec. 4, 2019

(87) PCT Pub. No.: WO2019/031288
PCT Pub. Date: Feb. 14, 2019

(65) Prior Publication Data
US 2020/0139641 A1     May 7, 2020

(30) Foreign Application Priority Data

Aug. 8, 2017 (JP) .............................. JP2017-153082
Feb. 27, 2018 (JP) .............................. JP2018-032717

(51) Int. Cl.
*B29C 70/08*       (2006.01)
*C08J 5/04*        (2006.01)
(Continued)

(52) U.S. Cl.
CPC .............. *B29C 70/08* (2013.01); *C08J 5/047* (2013.01); *B29K 2101/12* (2013.01);
(Continued)

(58) Field of Classification Search
CPC ....... Y10T 156/1084; Y10T 428/24508; Y10T 428/24132; Y10T 428/269; B29B 15/14;
(Continued)

(56) References Cited

U.S. PATENT DOCUMENTS 9,296,175 B2    3/2016   Yamaguchi et al.
10,584,218 B2   3/2020   Mitsutsuji et al.
(Continued)

FOREIGN PATENT DOCUMENTS

EP   2 682 248 A1   1/2014
JP     45-3368 B    2/1970
(Continued)

OTHER PUBLICATIONS

The First Office Action dated Sep. 27, 2021, of counterpart Chinese Patent Application No. 201880041289.8, along with an English translation.
(Continued)

Primary Examiner — Camie S Thompson
(74) Attorney, Agent, or Firm — DLA Piper LLP (US)

(57) ABSTRACT

A fiber reinforced thermoplastic resin molded article contains inorganic fibers (A), organic fibers (B), and a thermoplastic resin (C), the fiber reinforced thermoplastic resin molded article containing 5 to 45 parts by weight of the inorganic fibers (A), 1 to 45 parts by weight of the organic fibers (B), and 10 to 94 parts by weight of the thermoplastic resin (C), based on 100 parts by weight of the total of the inorganic fibers (A), the organic fibers (B), and the thermoplastic resin (C), the inorganic fibers (A) in the fiber reinforced thermoplastic resin molded article having a weight average fiber length ($L_{wa}$) of 0.01 mm or more and 3 mm or less, the organic fibers (B) having a weight average fiber length ($L_{wb}$) of more than 4 mm and 20 mm or less.

10 Claims, 1 Drawing Sheet

(51) Int. Cl.
  B29K 101/12 (2006.01)
  B29K 105/00 (2006.01)
  B29K 301/12 (2006.01)
  B29K 307/04 (2006.01)
(52) U.S. Cl.
  CPC .. *B29K 2105/0094* (2013.01); *B29K 2301/12* (2013.01); *B29K 2307/04* (2013.01); *C08J 2323/12* (2013.01); *C08J 2369/00* (2013.01); *C08J 2381/04* (2013.01); *C08J 2427/18* (2013.01); *C08J 2467/02* (2013.01); *C08J 2481/04* (2013.01)
(58) Field of Classification Search
  CPC .......... B29B 7/90; B29C 70/08; B29C 70/14; B29C 70/12; B29C 70/42; B29C 2045/0008; B29C 2045/0006; B29C 45/0005; C08J 5/047; C08J 5/042; C08J 5/046; C08J 2323/12; C08J 2369/04; C08J 2381/04; C08J 2467/02; C08J 2481/04; C08J 2300/22; C08L 23/12; C08K 7/02; B29K 2101/12; B29K 2301/12; B29K 2307/04
  USPC ..... 156/269, 276; 428/297.4, 114, 105, 339, 428/297.1, 297.7; 264/331.1
  See application file for complete search history.

(56) References Cited

U.S. PATENT DOCUMENTS

| | | | |
|---|---|---|---|
| 10,619,017 B2 | 4/2020 | Mitsutsuji et al. | |
| 2015/0291789 A1* | 10/2015 | Hirata | C08L 51/06 523/468 |

FOREIGN PATENT DOCUMENTS

| | | |
|---|---|---|
| JP | 52-12240 B | 4/1977 |
| JP | 61-7332 A | 1/1986 |
| JP | 06-287317 A | 10/1994 |
| JP | 06-306216 A | 11/1994 |
| JP | 08-150616 A | 6/1996 |
| JP | 2002-129027 A | 5/2002 |
| JP | 2009-013331 A | 1/2009 |
| JP | 2009-114332 A | 5/2009 |
| JP | 2010-121108 A | 6/2010 |
| JP | 2016-074779 A | 5/2016 |
| JP | 2017-082215 A | 5/2017 |
| WO | 2014/098103 A1 | 6/2014 |
| WO | 2017/073482 A1 | 5/2017 |
| WO | 2017/073483 A1 | 5/2017 |

OTHER PUBLICATIONS

Notice of Reasons for Refusal dated Apr. 21, 2020, of counterpart Japanese Application No. 2018-544947, along with a Partial Translation and an English Translation obtained from the Global Dossier.
Notification for the Opinion of Examination dated Mar. 29, 2022, of counterpart Taiwanese Patent Application No. 107127385, along with an English translation.
The Extended European Search Report dated Mar. 29, 2021, of counterpart European Application No. 18843289.2.
Notice of Preliminary Rejection dated Aug. 23, 2022, of counterpart Korean patent Application No. 10-2020-7000111, along with an English translation.

* cited by examiner

ND FIBER
REINFORCED THERMOPLASTIC
RESIN MOLDED ARTICLE AND FIBER
REINFORCED THERMOPLASTIC RESIN
MOLDING MATERIAL

TECHNICAL FIELD

This disclosure relates to a fiber reinforced thermoplastic resin molded article and a fiber reinforced thermoplastic resin molding material containing a thermoplastic resin, carbon fibers, and organic fibers.

BACKGROUND

Molded articles containing reinforcing fibers and a thermoplastic resin are lightweight and have excellent mechanical properties and, thus, have been widely used in sports applications, aerospace applications, general industrial applications and the like. Examples of the reinforcing fibers used in such molded articles include metal fibers such as aluminum fibers and stainless fibers, inorganic fibers such as silicon carbide fibers and carbon fibers, organic fibers such as aramid fibers and poly p-phenylene benzoxazole (PBO) fibers and the like. Carbon fibers are preferred from the viewpoint of a balance between specific strength, specific rigidity and lightness and, among them, polyacrylonitrile (PAN) based carbon fibers are suitably used.

Since carbon fibers have excellent specific strength and specific rigidity, a molded article reinforced with carbon fibers has excellent lightness and mechanical properties. For this reason, carbon fibers are widely used in various fields such as electronic equipment housings and automotive members. However, the above-described applications require further weight reduction and thickness reduction, and molded articles such as housings are required to have further lightness and mechanical properties (particularly impact properties). In particular, there is a strong demand in the field of large molded articles such as door lower garnishes and door inner panels in automotive members.

As a means of enhancing impact properties of the carbon fiber reinforced thermoplastic resin molded article include, for example, fiber reinforced thermoplastic resin molded articles containing carbon fibers, organic fibers and a thermoplastic resin in which the average fiber length and the average straight-line distance between two end-points of a single fiber (that is, average distance between two end-points of a single fiber) of the carbon fibers, and the average fiber length and the average straight-line distance between two end-points of a single fiber of the organic fibers are in specific ranges (see, for example, WO 2014/098103 A) have been proposed. Moreover, to improve mechanical strength, a fiber reinforced propylene resin composition containing organic fibers and carbon fibers has been proposed (see, for example, Japanese Patent Laid-open Publication No. 2016-74779). Further, a fiber reinforced rigid resin molding pellet containing fibers of different lengths in a resin-impregnated state has also been proposed (for example, Japanese Patent Laid-open Publication No. H06-287317).

However, the techniques described in WO '103, JP '779 and JP '317 still had insufficient mechanical properties, particularly impact properties. In particular, in the field of large molded articles, there is a strong demand for impact properties and, more specifically, fragment scattering preventing properties when a large molded article is destroyed are also required. More specifically as to the fragment scattering preventing properties, it is assumed that when a large molded article such as an automobile is destroyed by a collision or an impact, the molded article becomes sharp fragments and is scattered all over. As a result, it is assumed to have not only a damage that the scattered fragments directly hit human body, but also secondary damage caused by molded articles already scattered on the ground and the like when a person accuses them. Therefore, in a large molded article, the molded article is required not to be completely destroyed (not scattered) or broken into pieces even when the molded article is subjected to an impact, and such properties are not disclosed in WO '103, JP '779 and JP '317.

As described above, in the conventional technology, a fiber reinforced thermoplastic resin molded article having high mechanical properties, particularly excellent impact properties, is not obtained in a fiber reinforced thermoplastic resin molded article using a thermoplastic resin as a matrix, and development of such a fiber reinforced thermoplastic resin molded article has been desired.

It could therefore be helpful to provide a fiber reinforced thermoplastic resin molded article having excellent mechanical properties, particularly impact properties, and a fiber reinforced thermoplastic resin molding material capable of obtaining such a molded article.

SUMMARY

We thus provide:
(1) A fiber reinforced thermoplastic resin molded article containing inorganic fibers (A), organic fibers (B), and a thermoplastic resin (C),
the fiber reinforced thermoplastic resin molded article containing 5 to 45 parts by weight of the inorganic fibers (A), 1 to 45 parts by weight of the organic fibers (B), and 10 to 94 parts by weight of the thermoplastic resin (C), based on 100 parts by weight of a total of the inorganic fibers (A), the organic fibers (B), and the thermoplastic resin (C),
the inorganic fibers (A) in the fiber reinforced thermoplastic resin molded article having a weight average fiber length ($L_{wa}$) of 0.01 mm or more and 3 mm or less, the organic fibers (B) having a weight average fiber length ($L_{wb}$) of more than 4 mm and 20 mm or less.
(2) A fiber reinforced thermoplastic resin molding material containing inorganic fibers (A), organic fibers (B), a thermoplastic resin (C), and a component (D) having a melt viscosity at 200° C. lower than that of the thermoplastic resin (C),
the fiber reinforced thermoplastic resin molding material containing 5 to 45 parts by weight of the inorganic fibers (A), 1 to 45 parts by weight of the organic fibers (B), 10 to 93 parts by weight of the thermoplastic resin (C), and 1 to 20 parts by weight of the component (D), based on 100 parts by weight of a total of the inorganic fibers (A), the organic fibers (B), the thermoplastic resin (C), and the component (D),
the inorganic fibers (A) and the organic fibers (B) being arranged almost parallel to an axial direction,
lengths of the inorganic fibers (A) and the organic fibers (B) and a length of the fiber reinforced thermoplastic resin molding material being substantially equal to each other,
a length in a longer direction of the fiber reinforced thermoplastic resin molding material being 8 mm to 14 mm.
(3) A fiber reinforced thermoplastic resin molding material containing inorganic fibers (A), organic fibers (B), a thermoplastic resin (C), and a component (D) having a melt viscosity at 200° C. lower than that of the thermoplastic resin (C), composed of multiple types of pellets, the fiber reinforced thermoplastic resin molding material containing 5 to 45 parts by weight of the inorganic fibers (A), 1 to 45 parts by weight of the organic fibers (B), 10 to 93 parts by weight of the thermoplastic resin (C), and 1 to 20 parts by weight of the component (D), based on 100 parts by weight of a total of the inorganic fibers (A), the organic fibers (B), the thermoplastic resin (C), and the component (D), the multiple types of pellets including a pellet (x) containing the inorganic fibers (A), the thermoplastic resin (C), and the component (D), and a pellet (y) containing the organic fibers (B), a thermoplastic resin (F), and a component (G), the inorganic fibers (A) being arranged almost parallel to an axial direction of the pellets (x), and the organic fibers (B) being arranged almost parallel to an axial direction of the pellets (y), lengths of the inorganic fibers (A) and the pellets (x) being substantially equal to each other, and lengths of the organic fibers (B) and the pellets (y) being substantially equal to each other, lengths in a longer direction of the pellets (x) and the pellets (y) being 8 mm to 14 mm.

Since the fiber reinforced thermoplastic resin molded article contains inorganic fibers, organic fibers, and a thermoplastic resin, it has high reinforcing effect and excellent impact properties. Furthermore, since the fiber reinforced thermoplastic resin molded article contains organic fibers that are sufficiently longer than inorganic fibers, it also has an excellent effect of preventing fragment scattering when the molded article is destroyed. Such a molded article can be obtained by using the fiber reinforced thermoplastic resin molding material. Then, such a molded article is extremely useful for electrical and electronic equipment, office automation equipment, household electrical appliances, housings, automotive parts and the like, and are particularly suitably used for large molded articles.

DESCRIPTION OF REFERENCE SIGNS

Figure 1:
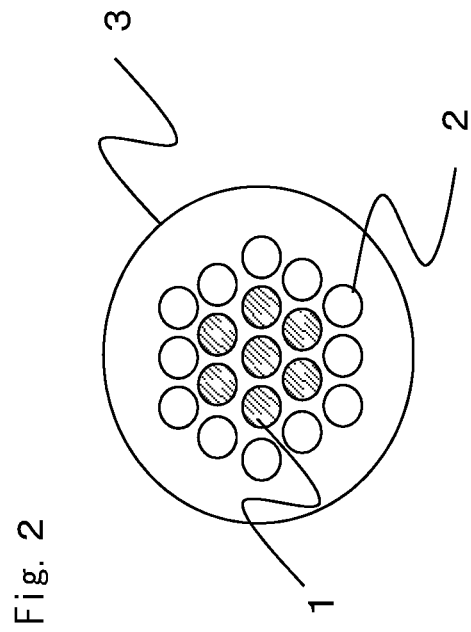
FIG. 1 is a schematic diagram showing a form in which inorganic fibers (A) contain organic fibers (B) in a molding material cross section.

1: Inorganic fiber (A)
2: Organic fiber (B)
3: Thermoplastic resin (C)
4: Component (D) having melt viscosity at 200° C. lower than that of thermoplastic resin (C)

DETAILED DESCRIPTION

We provide a fiber reinforced thermoplastic resin molded article containing inorganic fibers (A), organic fibers (B), and a thermoplastic resin (C), the fiber reinforced thermoplastic resin molded article containing: 5 to 45 parts by weight of the inorganic fibers (A), 1 to 45 parts by weight of the organic fibers (B), and 10 to 94 parts by weight of the thermoplastic resin (C), based on 100 parts by weight of the total of the inorganic fibers (A), the organic fibers (B), and the thermoplastic resin (C), wherein the inorganic fibers (A) in the fiber reinforced thermoplastic resin molded article have a weight average fiber length ($L_{wa}$) of 0.01 mm or more and 3 mm or less, and the organic fibers (B) have a weight average fiber length ($L_{wb}$) of more than 4 mm and 20 mm or less. We also provide a fiber reinforced thermoplastic resin molding material containing inorganic fibers (A), organic fibers (B), a thermoplastic resin (C), and a component (D) having a melt viscosity at 200° C. lower than that of the thermoplastic resin (C), the fiber reinforced thermoplastic resin molded article containing: 5 to 45 parts by weight of the inorganic fibers (A), 1 to 45 parts by weight of the organic fibers (B), 10 to 93 parts by weight of the thermoplastic resin (C), and 1 to 20 parts by weight of the component (D), based on 100 parts by weight of the total of the inorganic fibers (A), the organic fibers (B), the thermoplastic resin (C), and the component (D), wherein the inorganic fibers (A) and the organic fibers (B) are arranged almost parallel to the axial direction, the lengths of the components (A) and (B) and the length of the fiber reinforced thermoplastic resin molding material are substantially the same, and the length in the longer direction of the fiber reinforced thermoplastic resin molding material is 8 mm to 14 mm, which may be used to obtain the molded article. As described above, the fiber reinforced thermoplastic resin molded article (sometimes referred to as "molded article") and the fiber reinforced thermoplastic resin molding material (sometimes referred to as "molding material") both contains at least the inorganic fibers (A), the organic fibers (B), and the thermoplastic resin (C).

First, the molded article will be described in detail.

The molded article contains the organic fibers (B) together with the inorganic fibers (A), and the flexible organic fibers (B) are less likely to break during molding, and likely to remain in the molded article while keeping their long fiber length. Therefore, the molded article has high impact properties compared to a fiber reinforced thermoplastic resin molded article composed only of the rigid and brittle inorganic fibers (A). Specifically, the remaining fiber length of the organic fibers (B) in the molded article (in other words, the weight average fiber length ($L_{wb}$) in the molded article) is more than 4 mm and 20 mm or less, whereby higher impact properties can be imparted to the molded article. In addition, it also has an excellent effect of preventing fragment scattering when the molded article is destroyed.

The inorganic fibers (A) can improve mechanical properties as a molded article due to a fiber reinforcing effect on the thermoplastic resin (C). Furthermore, when the inorganic fibers have intrinsic characteristics such as conductivity and thermal conductivity, those properties that cannot be achieved with the thermoplastic resin (C) alone can be imparted to the molded article. As the inorganic fibers (A), carbon fibers or glass fibers are preferable. Among the inorganic fibers, carbon fibers are preferable from the viewpoint of effects of further improving the mechanical properties and reducing the weight of the molded article. Moreover, for the purpose of imparting conductivity, inorganic fibers coated with a metal such as nickel, copper or ytterbium are also preferably used.

The types of glass fibers are not particularly limited, and well-known glass fibers can be used. Specific examples of the glass fibers include T-120, T-187, T-187H and the like manufactured by Nippon Electric Glass Co., Ltd. In general, various binders are applied to glass fibers to improve handling properties by suppressing generation of fuzz and static electricity during use, and improve adhesion to the thermoplastic resin (C) as a matrix. Also, glass fibers provided with these binders can be used. The type of binder may be selected according to the type of the thermoplastic resin (C) as the matrix. Moreover, the amount of the binder applied to the glass fibers is preferably 0.1 to 3.0% by mass as a solid content, based on the mass of the entire glass fibers after application of the binder. When the amount of binder applied is 0.1% by mass or more, the handling properties and adhesion can be sufficiently improved. On the other hand, when the amount of binder applied is 3.0% by mass or less, impregnation of the thermoplastic resin (C) into the glass fibers can be promoted more effectively.

Examples of the binder include coupling agents represented by silane coupling agents such as aminosilanes, epoxy silanes and acrylic silanes, polymers such as vinyl acetate resins, urethane resins, acrylic resins, polyester resins, polyether resins, phenoxy resins, polyamide resins, epoxy resins and polyolefin resins or modified products thereof, and those containing oligomers such as waxes represented by polyolefin waxes. The above polymers and oligomers are generally used in the form of an aqueous dispersion obtained by water dispersion with a surfactant, or an aqueous solution obtained by water solubilization by neutralization or hydration of carboxyl groups or amide groups present in the skeleton of the polymer or oligomer. In addition to the above components, the binder may contain an inorganic salt such as lithium chloride or potassium iodide, an antistatic agent represented by a quaternary ammonium salt such as an ammonium chloride type or an ammonium ethosulfate type, a lubricant represented by an aliphatic ester-based, aliphatic ether-based, aromatic ester-based, or aromatic ether-based surfactant or the like.

The carbon fibers are not particularly limited, and examples thereof include PAN-based carbon fibers, pitch-based carbon fibers, rayon-based carbon fibers, cellulose-based carbon fibers, vapor-grown carbon fibers, and graphitized fibers thereof and the like. The PAN-based carbon fibers are carbon fibers using polyacrylonitrile fibers as a raw material. The pitch-based carbon fibers are carbon fibers using petroleum tar and petroleum pitch as raw materials. The cellulose-based carbon fibers are carbon fibers using viscose rayon, cellulose acetate and the like as raw materials. The vapor-grown carbon fibers are carbon fibers using hydrocarbon and the like as raw materials.

Further, the carbon fibers preferably have an oxygen concentration ratio of surfaces [O/C], which is the ratio of oxygen atoms (O) to carbon atoms (C) on the fiber surface as measured by X-ray photoelectron spectroscopy, of 0.05 to 0.5. When the oxygen concentration ratio of surfaces is 0.05 or more, a sufficient amount of functional groups can be secured on the carbon fiber surface to provide stronger adhesion to the thermoplastic resin (C), thereby further improving flexural strength and tensile strength of the molded article. The oxygen concentration ratio of surfaces is more preferably 0.08 or more, and further preferably 0.1 or more. Further, the upper limit of the oxygen concentration ratio of surfaces is generally preferably 0.5 or less, in terms of the balance between handleability and productivity of the carbon fibers. The oxygen concentration ratio of surfaces is more preferably 0.4 or less, and further preferably 0.3 or less.

The oxygen concentration ratio of surfaces of the carbon fibers is determined by X-ray photoelectron spectroscopy according to the following procedure. First, when a sizing agent or the like adheres to the carbon fiber surface, the sizing agent or the like is removed with a solvent. The carbon fibers are cut into 20 mm and spread on a sample support made of copper, then the interior of the sample chamber is maintained at $1 \times 10^{-8}$ Torr, using AlKα1,2 as an X-ray source. As a correction value of a peak associated with electrification during the measurement, the kinetic energy value (K.E.) of the main peak of $C_{1s}$ is set at 1,202 eV. The $C_{1s}$ peak area is determined by drawing a straight baseline in the K.E. range of 1,191 to 1,205 eV. The $O_{1s}$ peak area is determined by drawing a straight baseline in the K.E. range of 947 to 959 eV.

The oxygen concentration ratio of surfaces [O/C] is calculated as a ratio of the number of atoms, from the ratio of the $O_{1s}$ peak area to the $C_{1s}$ peak area, using an apparatus-specific sensitivity correction value. As the X-ray photoelectron spectrometer, model ES-200 manufactured by Kokusai Electric Inc. is used, and the sensitivity correction value is set at 1.74.

Examples of means of adjusting the oxygen concentration ratio of surfaces [O/C] to 0.05 to 0.5 include, but are not particularly limited to, methods such as electrolytic oxidation, chemical oxidation, and gas phase oxidation. Among them, electrolytic oxidation is preferred.

The average fiber diameter of the carbon fibers is not particularly limited, but is preferably 1 to 20 μm and more preferably 3 to 15 μm, from the viewpoint of mechanical properties and surface appearance of the molded article.

The carbon fiber may be surface-treated for the purpose of improving the adhesion between the carbon fibers and the thermoplastic resin (C) or the like. Examples of the surface treatment method include electrolytic treatment, ozone treatment, ultraviolet treatment and the like.

The carbon fibers may be provided with a sizing agent for the purpose of preventing fluffing of the carbon fibers, improving the adhesion between the carbon fibers and the thermoplastic resin (C) or the like. By applying a sizing agent, surface properties such as functional groups on the carbon fiber surface can be improved, and adhesion and composite overall properties can be improved.

Examples of the sizing agent include epoxy resins, phenolic resins, polyethylene glycol, polyurethanes, polyesters, emulsifiers, surfactants and the like. Two or more of these may be used. The sizing agent is preferably water-soluble or water-dispersible. Epoxy resins excellent in wettability with the carbon fibers are preferred, and polyfunctional epoxy resins are more preferred.

Examples of the polyfunctional epoxy resins include bisphenol A epoxy resins, bisphenol F epoxy resins, aliphatic epoxy resins, phenol novolac epoxy resins, and the like. Among them, aliphatic epoxy resins that easily exhibit adhesion to the thermoplastic resin (C) are preferred. Aliphatic epoxy resins, due to their flexible backbones, tend to have a structure with high toughness even at a high crosslink density. In addition, when the aliphatic epoxy resin is placed between the carbon fibers/thermoplastic resin, the fibers are made flexible and less prone to delamination so that the strength of the molded article can be further improved.

Examples of the polyfunctional aliphatic epoxy resins include diglycidyl ether compounds, polyglycidyl ether compounds and the like. Examples of the diglycidyl ether compounds include ethylene glycol diglycidyl ether, polyethylene glycol diglycidyl ethers, propylene glycol diglycidyl ether, polypropylene glycol diglycidyl ethers, 1,4-butanediol diglycidyl ether, neopentyl glycol diglycidyl ether, polytetramethylene glycol diglycidyl ethers, polyalkylene glycol diglycidyl ethers, and the like. Further, examples of the polyglycidyl ether compounds include glycerol polyglycidyl ether, diglycerol polyglycidyl ether, polyglycerol polyglycidyl ethers, sorbitol polyglycidyl ethers, arabitol polyglycidyl ethers, trimethylolpropane polyglycidyl ethers, trimethylolpropane glycidyl ethers, pentaerythritol polyglycidyl ethers, polyglycidyl ethers of aliphatic polyhydric alcohols, and the like.

Among the aliphatic epoxy resins, trifunctional or higher aliphatic epoxy resins are preferred, and aliphatic polyglycidyl ether compounds having three or more highly reactive glycidyl groups are more preferred. The aliphatic polyglycidyl ether compounds have a good balance between flexibility, crosslink density, and compatibility with the thermoplastic resin (C), and can further improve adhesion. Among these, glycerol polyglycidyl ether, diglycerol polyglycidyl ether, polyglycerol polyglycidyl ethers, polyethylene glycol glycidyl ethers, and polypropylene glycol glycidyl ethers are further preferred.

The adhesion amount of the sizing agent is preferably 0.01 to 10% by weight based on 100% by weight of the total of the sizing agent and the carbon fibers. When the sizing agent adhesion amount is 0.01% by weight or more, the adhesion to the thermoplastic resin (C) can be further improved. The sizing agent adhesion amount is more preferably 0.05% by weight or more, and further preferably 0.1% by weight or more. On the other hand, when the sizing agent adhesion amount is 10% by weight or less, physical properties of the thermoplastic resin (C) can be maintained at a higher level. The sizing agent adhesion amount is more preferably 5% by weight or less, and further preferably 2% by weight or less.

The means of applying the sizing agent is not particularly limited, and examples thereof include a method in which a sizing agent is dissolved (or dispersed) in a solvent (including a dispersion medium, in dispersing the sizing agent) to prepare a sizing treatment liquid, and the resulting sizing treatment liquid is applied to the carbon fibers, followed by drying and vaporizing the solvent to remove the solvent. Examples of the method of applying the sizing treatment liquid to the carbon fibers include a method of immersing the carbon fibers in the sizing treatment liquid via a roller, a method of bringing the carbon fibers into contact with a roller to which the sizing treatment liquid is adhered, a method of spraying the sizing treatment liquid onto the carbon fibers in the form of a mist and the like. Moreover, the means of applying the sizing agent may be either a batch type or a continuous type, but preferred is the continuous type which allows for achieving high productivity and small variation. At this time, it is preferable to adjust the concentration of the sizing treatment liquid, temperature, yarn tension, and the like so that the amount of the sizing agent adhered to the carbon fibers is uniform within an appropriate range. Further, it is more preferable to excite the carbon fibers with ultrasonic waves when applying the sizing treatment agent.

The drying temperature and drying time should be adjusted according to the adhesion amount of the compound, and from the viewpoint of completely removing the solvent used in the sizing treatment liquid, shortening the time required for drying, preventing thermal deterioration of the sizing agent, and preventing the sizing-treated carbon fibers from being hard and deteriorating spreadability, the drying temperature is preferably 150° C. or more and 350° C. or less, and more preferably 180° C. or more and 250° C. or less.

Examples of the solvent used in the sizing treatment liquid include water, methanol, ethanol, dimethylformamide, dimethylacetamide, acetone and the like. Water is preferred from the viewpoint of easy handling and disaster prevention. Thus, when a compound insoluble or poorly soluble in water is used as the sizing agent, it is preferable to add an emulsifier and a surfactant and use the compound as an aqueous dispersion. As specific emulsifiers or surfactants, anionic emulsifiers such as styrene-maleic anhydride copolymers, olefin-maleic anhydride copolymers, naphthalene sulfonate formalin condensates, and sodium polyacrylate; cationic emulsifiers such as polyethyleneimine and polyvinyl imidazoline; nonionic emulsifiers such as nonylphenol ethylene oxide adducts, polyvinyl alcohol, polyoxyethylene ether ester copolymers, and sorbitan ester ethyl oxide adducts and the like can be used. Nonionic emulsifiers having little interaction are preferred because they are less likely to inhibit an adhesive effect of functional groups contained in the sizing agent.

The molded article contains 5 to 45 parts by weight of the inorganic fibers (A), based on 100 parts by weight of the total of the inorganic fibers (A), the organic fibers (B), and the thermoplastic resin (C). When the content of the inorganic fibers (A) is less than 5 parts by weight, impact properties of the molded article are lowered. The content of the inorganic fibers (A) is preferably 10 parts by weight or more. On the other hand, when the content of the inorganic fibers (A) is more than 45 parts by weight, dispersibility of the fibers is deteriorated so that entanglement of the fibers increases. As a result, fiber breakage occurs so that the fiber length is shortened, and impact properties including fragment scattering prevention are lowered. The content of the inorganic fibers (A) is preferably 30 parts by weight or less.

The thermoplastic resin (C) is a matrix resin constituting a molded article and a molding material. The thermoplastic resin (C) preferably has a molding temperature (melting temperature) of 200 to 450° C., and examples thereof include polyolefin resins, polystyrene resins, polyamide resins, vinyl halide resins, polyacetal resins, saturated polyester resins, polycarbonate resins, polyarylsulfone resins, polyarylketone resins, polyarylene ether resins, polyarylene sulfide resins, polyaryl ether ketone resins, polyethersulfone resins, polyarylene sulfide sulfone resins, polyarylate resins, polyamide resins and the like. Two or more of these can also be used. As the polyolefin resin, a polypropylene resin is preferable.

Among the thermoplastic resin (C), at least one selected from the group consisting of polypropylene resins, polyamide resins, polycarbonate resins, and polyarylene sulfide resins that are lightweight and excellent in balance between mechanical properties and moldability is more preferable, and polypropylene resins and polycarbonate resins are further preferable because of excellent versatility. The polypropylene resin may be unmodified one or modified one.

Specific examples of the unmodified polypropylene resins include propylene homopolymer, copolymers of propylene and at least one monomer selected from the group consisting of α-olefins, conjugated dienes, non-conjugated dienes and other thermoplastic monomers and the like. Examples of the copolymers include random copolymers, block copolymers and the like. Examples of α-olefins include C2-C12 α-olefins excluding propylene such as ethylene, 1-butene, 3-methyl-1-butene, 4-methyl-1-pentene, 3-methyl-1-pentene, 4-methyl-1-hexene, 4,4-dimethyl-1-hexene, 1-nonene, 1-octene, 1-heptene, 1-hexene, 1-decene, 1-undecene, and 1-dodecene. Examples of the conjugated diene or non-conjugated diene include butadiene, ethylidene norbornene, dicyclopentadiene, 1,5-hexadiene and the like. Two or more of these may be used. Preferred examples include polypropylene, ethylene-propylene copolymers, propylene-1-butene copolymers, ethylene-propylene-1-butene copolymers and the like. The propylene homopolymer is preferred from the viewpoint of improving rigidity of the molded article. A random or block copolymer of propylene and at least one monomer selected from the group consisting of α-olefins, conjugated dienes, non-conjugated dienes is preferred from the viewpoint of further improving the impact properties of the molded article.

Moreover, the modified polypropylene resin is preferably an acid-modified polypropylene resin, and more preferably an acid-modified polypropylene resin having a carboxylic acid and/or carboxylate group bound to a polymer chain. The acid-modified polypropylene resin can be obtained by various methods. For example, the acid-modified polypropylene resin can be obtained by the graft polymerization of an unmodified polypropylene resin with a monomer having a carboxylic acid group that is neutralized or not neutralized, and/or a monomer having a carboxylic acid ester group that is saponified or not saponified.

Examples of the monomer having a carboxylic acid group that is neutralized or not neutralized or the monomer having a carboxylic acid ester group that is saponified or not saponified include ethylenically unsaturated carboxylic acids, anhydrides thereof, esters of ethylenically unsaturated carboxylic acids and the like.

Examples of the ethylenically unsaturated carboxylic acids include (meth)acrylic acid, maleic acid, fumaric acid, tetrahydrophthalic acid, itaconic acid, citraconic acid, crotonic acid, isocrotonic acid and the like. Examples of the anhydrides thereof can include nadic acid TM (endocis-bicyclo[2,2,1]hept-5-ene-2,3-dicarboxylic acid), maleic anhydride, citraconic anhydride and the like.

Examples of the esters of ethylenically unsaturated carboxylic acids include (meth)acrylic acid esters such as methyl (meth)acrylate, ethyl (meth)acrylate, propyl (meth)acrylate, n-butyl (meth)acrylate, iso-butyl (meth)acrylate, tert-butyl (meth)acrylate, n-amyl (meth)acrylate, isoamyl (meth)acrylate, n-hexyl (meth)acrylate, 2-ethylhexyl (meth)acrylate, octyl (meth)acrylate, decyl (meth)acrylate, dodecyl (meth)acrylate, octadecyl (meth)acrylate, stearyl (meth)acrylate, tridecyl (meth)acrylate, lauroyl (meth)acrylate, cyclohexyl (meth)acrylate, benzyl (meth)acrylate, phenyl (meth)acrylate, isobornyl (meth)acrylate, dicyclopentanyl (meth)acrylate, dicyclopentenyl (meth)acrylate, dimethylaminoethyl (meth)acrylate, and diethylaminoethyl (meth)acrylate; hydroxyl group-containing (meth)acrylic acid esters such as hydroxyethyl acrylate, 2-hydroxyethyl (meth)acrylate, 2-hydroxypropyl (meth)acrylate, 4-hydroxybutyl acrylate, lactone-modified hydroxyethyl (meth)acrylate, and 2-hydroxy-3-phenoxypropyl acrylate; epoxy group-containing (meth)acrylic acid esters such as glycidyl (meth)acrylate and methyl glycidyl (meth)acrylate; aminoalkyl (meth)acrylates such as N,N-dimethylaminoethyl (meth)acrylate, N,N-diethylaminoethyl (meth)acrylate, N,N-dimethylaminopropyl (meth)acrylate, N,N-dipropylaminoethyl (meth)acrylate, N,N-dibutylaminoethyl (meth)acrylate, and N,N-dihydroxyethylaminoethyl (meth)acrylate and the like.

Two or more of these can also be used. Among these, anhydrides of ethylenically unsaturated carboxylic acids are preferred, and maleic anhydride is more preferred.

It is preferable to use both an unmodified polypropylene resin and a modified polypropylene resin to further improve the flexural strength and the tensile strength of the molded article. In particular, from the viewpoint of the balance between flame retardancy, the flexural strength and the tensile strength, it is preferable to use these resins such that the weight ratio of the unmodified polypropylene resin to the modified polypropylene resin is 95/5 to 75/25. The weight ratio is more preferably 95/5 to 80/20, and further preferably 90/10 to 80/20.

The polyamide resin is a resin using amino acids, lactams or diamines and dicarboxylic acids as main raw materials. Examples of the main raw materials include amino acids such as 6-aminocaproic acid, 11-aminoundecanoic acid, 12-aminododecanoic acid, and p-aminomethyl benzoic acid; lactams such as ε-caprolactam and ω-laurolactam; aliphatic diamines such as tetramethylenediamine, hexamethylenediamine, 2-methylpentamethylenediamine, nonamethylenediamine, undecamethylenediamine, dodecamethylenediamine, 2,2,4-/2,4,4-trimethylhexamethylenediamine, and 5-methylnonamethylenediamine; aromatic diamines such as m-xylylenediamine and p-xylylenediamine; alicyclic diamines such as 1,3-bis(aminomethyl)cyclohexane, 1,4-bis(aminomethyl)cyclohexane, 1-amino-3-aminomethyl-3,5,5-trimethylcyclohexane, bis(4-aminocyclohexyl)methane, bis(3-methyl-4-aminocyclohexyl)methane, 2,2-bis(4-aminocyclohexyl)propane, bis(aminopropyl)piperazine, and aminoethylpiperazine; aliphatic dicarboxylic acids such as adipic acid, suberic acid, azelaic acid, sebacic acid, and dodecanedioic acid; aromatic dicarboxylic acids such as terephthalic acid, isophthalic acid, 2-chloroterephthalic acid, 2-methylterephthalic acid, 5-methylisophthalic acid, 5-sodium sulfoisophthalic acid, hexahydroterephthalic acid, and hexahydroisophthalic acid; alicyclic dicarboxylic acids such as 1,4-cyclohexanedicarboxylic acid, 1,3-cyclohexanedicarboxylic acid, and 1,2-cyclohexanedicarboxylic acid; and the like. Two or more of these may be used.

Polyamide resins having a melting point of 200° C. or more, which are excellent in heat resistance and strength, are particularly useful. Specific examples thereof include polycaproamide (nylon 6), polyhexamethylene adipamide (nylon 66), polycaproamide/polyhexamethylene adipamide copolymer (nylon 6/66), polytetramethylene adipamide (nylon 46), polyhexamethylene sebacamide (nylon 610), polyhexamethylene dodecamide (nylon 612), polyhexamethylene terephthalamide/polycaproamide copolymer (nylon 6T/6), polyhexamethylene adipamide/polyhexamethylene terephthalamide copolymer (nylon 66/6T), polylaurylamide/polyhexamethylene terephthalamide copolymer (nylon 12T/6), polyhexamethylene adipamide/polyhexamethylene isophthalamide copolymer (nylon 66/6I), polyhexamethylene adipamide/polyhexamethylene terephthalamide/polyhexamethylene isophthalamide copolymer (nylon 66/6T/6I), polyhexamethylene adipamide/polyhexamethylene isophthalamide/polycaproamide copolymer (nylon 66/6I/6), polyhexamethylene terephthalamide/polyhexamethylene isophthalamide copolymer (nylon 6T/6I), polyhexamethylene terephthalamide/polydodecaneamide copolymer (nylon 6T/12), polyhexamethylene terephthalamide/poly(2-methylpentamethylene) terephthalamide copolymer (nylon 6T/M5T), polyxylylene adipamide (nylon XD6), polynonamethylene terephthalamide (nylon 9T), copolymers thereof and the like. Two or more of these may be used. Among these, nylon 6 and nylon 66 are more preferred.

The degree of polymerization of the polyamide resin is not particularly limited since it has excellent fluidity during molding and a thin molded article can be easily obtained, the relative viscosity, as measured at 25° C. in a solution of 0.25 g of the polyamide resin in 25 ml of 98% concentrated sulfuric acid, is preferably 1.5 to 5.0, and more preferably 2.0 to 3.5.

The polycarbonate resin is obtained by reacting a dihydric phenol with a carbonate precursor. It may be a copolymer obtained by using two or more dihydric phenols or two or more carbonate precursors. Examples of the reaction method include interfacial polymerization, melt transesterification, solid phase transesterification of a carbonate prepolymer, ring-opening polymerization of a cyclic carbonate compound and the like. Such polycarbonate resins are known per se and, for example, the polycarbonate resins described in Japanese Patent Laid-open Publication No. 2002-129027 can be used.

Examples of the dihydric phenol include 1,1-bis(4-hydroxyphenyl)-3,3,5-trimethylcyclohexane, bis(4-hydroxyphenyl)alkane (such as bisphenol A), 2,2-bis{(4-hydroxy-3-methyl)phenyl}propane, α,α'-bis(4-hydroxyphenyl)-m-diisopropylbenzene, 9,9-bis(4-hydroxy-3-methylphenyl)fluorine and the like. Two or more of these may be used. Among these, bisphenol A is preferable, and a polycarbonate resin having more excellent impact properties can be obtained. On the other hand, copolymers obtained using bisphenol A and other dihydric phenols are excellent in terms of high heat resistance or low water absorption.

Examples of the carbonate precursors include carbonyl halides, carbonic acid diesters or haloformates and the like. Specific examples include phosgene, diphenyl carbonate or dihaloformates of dihydric phenols and the like.

In producing a polycarbonate resin from the dihydric phenols and the carbonate precursor, a catalyst, an end terminator, an antioxidant for preventing oxidation of the dihydric phenols and the like may be used as necessary.

Further, the polycarbonate resin may be a branched polycarbonate resin obtained by copolymerization of a trifunctional or higher polyfunctional aromatic compound; a polyester carbonate resin obtained by copolymerization of an aromatic or aliphatic (including alicyclic) difunctional carboxylic acid; a copolymerized polycarbonate resin obtained by copolymerization of a difunctional aliphatic (including alicyclic) alcohol; or a polyester carbonate resin obtained by copolymerization of both of a difunctional carboxylic acid and a difunctional alcohol. Also, two or more of these polycarbonate resins may be used.

The molecular weight of the polycarbonate resin is not particularly limited, but is preferably 10,000 to 50,000 in terms of viscosity average molecular weight. A viscosity average molecular weight of 10,000 or more can further improve the strength of the molded article. The viscosity average molecular weight is more preferably 15,000 or more, and further preferably 18,000 or more. On the other hand, a viscosity average molecular weight of 50,000 or less improves moldability. The viscosity average molecular weight is more preferably 40,000 or less, and further preferably 30,000 or less. When two or more polycarbonate resins are used, it is preferred that at least one of the polycarbonate resins have a viscosity average molecular weight within the range described above. In this example, a polycarbonate resin having a viscosity average molecular weight of more than 50,000, preferably more than 80,000 is preferably used as the other polycarbonate resin. Such a polycarbonate resin has a high entropy elasticity, and thus is advantageous when molding such as gas-assisted molding is used in combination, and exhibits properties derived from the high entropy elasticity (anti-drip properties, drawdown properties, and properties of improving melt properties such as improved jetting).

The viscosity average molecular weight (M) of the polycarbonate resin is a value determined by substituting the specific viscosity ($\eta sp$) obtained from a solution of 0.7 g of the polycarbonate resin in 100 ml of methylene chloride at 20° C., into the equation below:

$\eta sp/c = [\eta] + 0.45 \times [\eta]^2$ (where $[\eta]$ is a limiting viscosity)

$[\eta] = 1.23 \times 10^{-4} M^{0.83}$ $c = 0.7$.

The melt viscosity of the polycarbonate resin is not limited, but the melt viscosity at 200° C. is preferably 10 to 25,000 Pa·s. A melt viscosity at 200° C. is 10 Pa·s or more can further improve the strength of the molded article. The melt viscosity is more preferably 20 Pa·s or more, and further preferably 50 Pa·s or more. On the other hand, a melt viscosity at 200° C. is 25,000 Pa·s or less improves moldability. The melt viscosity is more preferably 20,000 Pa·s or less, and further preferably 15,000 Pa·s or less.

As the polycarbonate resin, one put on the market as "Iupilon" (registered trademark), "NOVAREX" (registered trademark) manufactured by Mitsubishi Engineering-Plastics Corporation, "PANLITE" (registered trademark) manufactured by Teijin Chemicals Limited, "TARFLON" (registered trademark) manufactured by Idemitsu Petrochemical Co., Ltd or the like can also be used.

Examples of the polyarylene sulfide resin include polyphenylene sulfide (PPS) resins, polyphenylene sulfide sulfone resins, polyphenylene sulfide ketone resins, random or block copolymers thereof and the like. Two or more of these may be used. Among them, a polyphenylene sulfide resin is particularly preferably used.

The polyarylene sulfide resin can be produced, for example, by any method such as a method of obtaining a polymer having a relatively small molecular weight described in Japanese Examined Patent Publication No. S45-3368, and a method of obtaining a polymer having a relatively large molecular weight described in Japanese Examined Patent Publication No. S52-12240 and Japanese Patent Laid-open Publication No. S61-7332.

The resulting polyarylene sulfide resin may be subjected to various treatments such as crosslinking/polymerization by heating in air, heat treatment under an inert gas atmosphere such as nitrogen or under reduced pressure, washing with an organic solvent, hot water, an acid aqueous solution and the like, activation with a functional group-containing compound such as an acid anhydride, amine, isocyanate, and a functional group-containing disulfide compound.

Examples of the method of crosslinking/polymerization of the polyarylene sulfide resin by heating can include a method of heating in a heating container at a predetermined temperature until a desired melt viscosity is obtained, in an oxidizing gas atmosphere such as air or oxygen or in a mixed gas atmosphere of the oxidizing gas and an inert gas such as nitrogen or argon. The heat treatment temperature is preferably 200 to 270° C., and the heat treatment time is preferably 2 to 50 hours. By adjusting the treatment temperature and treatment time, the viscosity of the resulting polymer can be adjusted to the desired range. Examples of the heat treatment device include a normal hot air dryer, a rotary type heating device, a heating device with stirring blades, and the like. From the viewpoint of performing heat treatment efficiently and more uniformly, it is preferable to use a rotary type heating device or a heating device with stirring blades.

When the polyarylene sulfide resin is treated under reduced pressure, the pressure is preferably 7,000 Nm$^{-2}$ or less. Examples of the heat treatment device include a normal hot air dryer, a rotary type heating device, a heating device with stirring blades and the like. From the viewpoint of performing heat treatment efficiently and more uniformly, it is preferable to use a rotary type heating device or a heating device with stirring blades.

When the polyarylene sulfide resin is washed with an organic solvent, examples of the organic solvent include nitrogen-containing polar solvents such as N-methylpyrrolidone, dimethylformamide, and dimethylacetamide; sulfoxide and sulfone solvents such as dimethylsulfoxide, and dimethylsulfone; ketone solvents such as acetone, methyl ethyl ketone, diethyl ketone, and acetophenone; ether solvents such as dimethyl ether, dipropyl ether, and tetrahydrofuran; halogen solvents such as chloroform, methylene chloride, trichloroethylene, ethylene dichloride, dichloroethane, tetrachloroethane, and chlorobenzene; alcohols or phenolic solvents such as methanol, ethanol, propanol, butanol, pentanol, ethylene glycol, propylene glycol, phenol, cresol, and polyethylene glycol; aromatic hydrocarbon solvents such as benzene, toluene, and xylene; and the like. Two or more of these may be used. Among these organic solvents, N-methylpyrrolidone, acetone, dimethylformamide, chloroform and the like are preferably used. Examples of the washing method using an organic solvent include a method of immersing a polyarylene sulfide resin in an organic solvent and the like. If necessary, stirring or heating can be appropriately performed. The washing temperature when washing the polyarylene sulfide resin in an organic solvent is preferably from room temperature to 150° C. The polyarylene sulfide resin that has been washed with an organic solvent is preferably washed several times with water or warm water to remove the remaining organic solvent.

When the polyarylene sulfide resin is washed with hot water, it is preferred that the water being used is distilled water or deionized water to exhibit preferable chemical modification effect of the polyarylene sulfide resin by hot water washing. The hot water washing is usually performed by charging a predetermined amount of a polyarylene sulfide resin into a predetermined amount of water, and heating and stirring at normal pressure or in a pressure vessel. As the ratio of the polyarylene sulfide resin and water, a bath ratio of 200 g or less of the polyarylene sulfide resin per 1 liter of water is preferably selected.

Examples of the method of acid-treating a polyarylene sulfide resin include a method of immersing a polyarylene sulfide resin in an acid or an aqueous solution of the acid and the like. If necessary, stirring or heating can be appropriately performed. Examples of the acid include aliphatic saturated monocarboxylic acids such as formic acid, acetic acid, propionic acid, and butyric acid; halo-substituted aliphatic saturated carboxylic acids such as chloroacetic acid and dichloroacetic acid; aliphatic unsaturated monocarboxylic acids such as acrylic acid and crotonic acid; aromatic carboxylic acids such as benzoic acid and salicylic acid; dicarboxylic acids such as oxalic acid, malonic acid, succinic acid, phthalic acid, and fumaric acid; inorganic acidic compounds such as sulfuric acid, phosphoric acid, hydrochloric acid, carbonic acid, and silicic acid; and the like. Among these acids, acetic acid or hydrochloric acid is preferably used. The acid-treated polyarylene sulfide resin is preferably washed several times with water or warm water to remove the remaining acid or salt. The water used for washing is preferably distilled water or deionized water.

The melt viscosity of the polyarylene sulfide resin is preferably 80 Pa·s or less, and more preferably 20 Pa·s or less, under conditions of 310° C. and a shear rate of 1,000/sec. Although the lower limit of the melt viscosity is not particularly limited, it is preferably 5 Pa·s or more. Two or more polyarylene sulfide resins having different melt viscosities may be used in combination. The melt viscosity can be measured using a capillograph (manufactured by Toyo Seiki Co., Ltd.) under the conditions of a die length of 10 mm and a die hole diameter of 0.5 to 1.0 mm.

As the polyarylene sulfide resins, one put on the market as "TORELINA" (registered trademark) manufactured by Toray Industries, Inc., "DIC.PPS" (registered trademark) manufactured by DIC Corporation, "DURAFIDE" (registered trademark) manufactured by Polyplastics Co., Ltd. or the like can also be used.

The content of the thermoplastic resin (C) in the molded article is 10 to 94 parts by weight, based on 100 parts by weight of the total of the inorganic fibers (A), the organic fibers (B), and the thermoplastic resin (C). When the content of the thermoplastic resin (C) is less than 10 parts by weight, fiber dispersibility of the inorganic fibers (A) and the organic fibers (B) in the molded article is deteriorated, and the impact properties are lowered. The content of the thermoplastic resin (C) is preferably 30 parts by weight or more. On the other hand, when the content of the thermoplastic resin (C) is more than 94 parts by weight, the content of the inorganic fibers (A) and the organic fibers (B) is relatively low so that a reinforcing effect by the fibers is reduced and the impact properties are lowered. The content of the thermoplastic resin (C) is preferably 85 parts by weight or less, and more preferably 75 parts by weight or less.

The molded article contains the organic fibers (B) in addition to the inorganic fibers (A) described above. Inorganic fibers such as the inorganic fibers (A) are rigid and brittle, thus they are less prone to entanglement and are prone to breakage. Therefore, a fiber bundle consisting only of inorganic fibers has drawbacks in that it is likely to break during the production of a molded article and prone to fall off from the molded article. Therefore, the impact properties of the molded article can be significantly improved by containing the organic fibers (B) that are flexible and less susceptible to breakage.

The organic fibers (B) can be selected as appropriate to the extent that the mechanical properties of the molded article are not significantly reduced. Examples thereof can include fibers obtained by spinning: polyolefin resins such as polyethylene and polypropylene; polyamide resins such as nylon 6, nylon 66, and aromatic polyamides; polyester resins such as polyethylene terephthalate and polybutylene terephthalate; fluororesins such as polytetrafluoroethylene, perfluoroethylene-propene copolymers, and ethylene-tetrafluoroethylene copolymers; liquid crystal polymers such as liquid crystal polyester and liquid crystal polyester amide; polyarylene sulfides such as polyether ketone, polyether sulfone, and polyphenylene sulfide; and resins such as polyacrylonitrile. Two or more of these may be used. Among these organic fibers (B), it is preferable to select and use as appropriate depending on the tensile break elongation and the combination with the thermoplastic resin (C). In particular, the organic fibers (B) preferably have a melting temperature that is 30° C. to 150° C. higher and, more preferably, 50° C. to 100° C. higher than the molding temperature (melting temperature) of the thermoplastic resin (C). Alternatively, organic fibers (B) obtained using a resin incompatible with the thermoplastic resin (C) are preferred because they will be present in the molded article while maintaining the fiber state, and thus can further improve the impact properties of the molded article. Examples of the organic fibers (B) having a high melting temperature include polyamide fibers, polyester fibers, polyarylene sulfide fibers and fluororesin fibers and the like. As the organic fibers (B), it is preferable to use at least one type of fibers selected from the group consisting of these fibers.

The single fiber fineness of the organic fibers (B) is preferably 0.1 to 10 dtex.

The single yarn tenacity of the organic fibers (B) is preferably 30 cN or more. The single yarn tenacity indicates a value obtained by multiplying the single yarn strength of the organic fibers (B) by the single yarn cross-sectional area of the organic fibers (B). The single yarn strength of the organic fibers (B) can be determined by a known single yarn tensile test. The single yarn cross-sectional area can be obtained from a general electron microscope. For example, using InTouchScope JSM-6010LA manufactured by JEOL Ltd., the single yarn cross-sectional area can be obtained by taking a cross-sectional image of a fiber set at a magnification of 2,000 times, and performing image processing from the obtained microscopic image and analyzing it. When the single yarn tenacity is 30 cN or more, the organic fibers (B) hardly break when the molded article is broken so that the fiber reinforcing effect in the molded article can be enhanced.

The content of the organic fibers (B) in the molded article is 1 to 45 parts by weight, based on 100 parts by weight of the total of the inorganic fibers (A), the organic fibers (B), and the thermoplastic resin (C). When the content of the organic fibers (B) is less than 1 part by weight, the impact properties of the molded article are lowered and the molded article is also inferior in fragment scattering prevention. The content of the organic fibers (B) is preferably 3 parts by weight or more. On the other hand, when the content of the organic fibers (B) is more than 45 parts by weight, the entanglement of the fibers increases, the dispersibility of the organic fibers (B) in the molded article is deteriorated, and it often causes deterioration of the impact properties of the molded article. The content of the organic fibers (B) is preferably 20 parts by weight or less, and more preferably 10 parts by weight or less.

The molded article may contain other components in addition to the above-described components (A) to (C) to the extent that the desired effect is not impaired. Examples of the other components include thermosetting resins, fire retardants, nucleators, ultraviolet absorbers, antioxidants, damping materials, antibacterial agents, insect repellents, deodorants, anti-coloring agents, thermal stabilizers, mold release agents, antistatic agents, plasticizers, lubricants, colorants, pigments, dyes, foaming agents, anti-foaming agents, coupling agents and the like. Further, for example, it may contain a component (D) used in a molding material described later.

The inorganic fibers (A) have a weight average fiber length ($L_{wa}$) of 0.01 mm or more and 3 mm or less in the molded article. When the inorganic fibers (A) have a weight average fiber length ($L_{wa}$) of less than 0.01 mm, it is difficult to exhibit effects of improving the flexural strength and impact properties of the molded article. $L_{wa}$ is preferably 0.05 mm or more, further preferably 0.1 mm or more, more preferably 0.5 mm or more, and most preferably 0.7 mm or more. On the other hand, when the weight average fiber length ($L_{wa}$) is more than 3 mm, it is difficult to prevent the entanglement between the single yarns of the inorganic fibers (A) and difficult to improve dispersibility so that it is difficult to exhibit an effect of improving the flexural strength of the molded article. $L_{wa}$ is preferably 2.5 mm or less, further preferably 2 mm or less, more preferably 1.5 mm or less, and most preferably 1.2 mm or less.

Also, the organic fibers (B) have a weight average fiber length ($L_{wb}$) of more than 4 mm and 20 mm or less in the molded article. When the weight average fiber length ($L_{wb}$) of the organic fibers (B) is 4 mm or less, it is difficult to exhibit the reinforcing effect of the organic fibers (B) in the molded article and it is inferior in the impact properties. In particular, it is inferior in an effect of preventing fragment scattering when the molded article is broken. $L_{wb}$ is preferably 5 mm or more. On the other hand, when the average fiber length ($L_{wb}$) is more than 20 mm, it is difficult to prevent the entanglement between the single yarns of the organic fibers (B) and difficult to improve the dispersibility so that it is inferior in the impact properties of the molded article. $L_{wb}$ is more preferably 14 mm or less, and further preferably 10 mm or less. By adjusting the weight average fiber length ($L_{wb}$) of the organic fibers (B) to the above-described range, the entanglement between the single yarns of the organic fiber is prevented, and the organic fibers (B) exist in the dispersed state while the fibers are curved. As a result, crack advance when the molded article is destroyed is not unidirectional, and more impact energy can be absorbed so that division of the molded article can be suppressed and the scattering preventing properties of the molded article can be improved.

The term "weight average fiber length" refers, not to a simple number average value, but to an average fiber length calculated according to the equation below that applies the method of calculating a weight average molecular weight to fiber length calculation and takes into account the contribution of fiber length. The equation is applicable when the fiber diameters and density of the inorganic fibers (A) and the organic fibers (B) are constant:

$$\text{Weight average fiber length} = \Sigma(Mi_2 \times Ni)/\Sigma(Mi \times Ni)$$

Mi: Fiber length (mm)

Ni: Number of reinforcing fibers with fiber length Mi.

The weight average fiber length can be measured by the following method. An ISO dumbbell specimen is heated in a state sandwiched between glass plates on a hot stage at 200 to 300° C. to form a film in which fibers are uniformly dispersed. The film in which the fibers are uniformly dispersed is observed with an optical microscope (50 to 200 times). The fiber lengths of 1,000 randomly selected inorganic fibers (A) and organic fibers (B) are measured, and the weight average fiber length ($L_{wa}$) of the inorganic fibers (A) and the weight average fiber length ($L_{wb}$) of the organic fibers (B) are calculated according to the above equation.

The weight average fiber length of the inorganic fibers (A) and the organic fibers (B) in the molded article can be adjusted, for example, according to the molding conditions and the like. Examples of such molding conditions, in injection molding, include pressure conditions such as back pressure and holding pressure, time conditions such as injection time and pressure holding time, and temperature conditions such as cylinder temperature and mold temperature. Specifically, using the fact that the organic fibers (B) are more flexible and less likely to break than the inorganic fibers (A), shearing force within a cylinder is appropriately increased by increasing the pressure conditions such as back pressure, and the average fiber length of the inorganic fibers (A) is made shorter than that of the organic fibers (B). Further, by appropriately shortening the injection time, the shearing force during the injection may be appropriately increased, and the average fiber length of the inorganic fibers (A) may be shortened compared to that of the organic fibers (B). Furthermore, when the temperature such as the cylinder temperature or mold temperature is appropriately lowered, the viscosity of the flowing resin is increased and the shearing force can be increased. Thus, the average fiber length of the inorganic fibers (A) can be shortened compared to that of the organic fibers (B) by this method. By appropriately changing the conditions as described above, the average fiber lengths of the inorganic fibers (A) and the organic fibers (B) in the molded article can be adjusted to desired ranges. Among them, it is particularly effective to adjust the shearing force by controlling the back pressure condition and the injection time. However, when the shearing force acting on the fibers is increased more than necessary, the average fiber lengths of not only the inorganic fibers (A), but also the organic fibers (B) are shortened, so care is required.

The weight average fiber length ($L_{wa}$) of the inorganic fibers (A) and the weight average fiber length ($L_{wb}$) of the organic fibers (B) can be adjusted to the above ranges by using the molding material described later.

The weight average fiber length of the inorganic fibers (A) in the molded article is 0.05 to 2.5 mm, and it is preferred that the relationship of the weight average fiber lengths of the inorganic fibers (A) and the organic fibers (B) satisfies the following inequality:

$$8<(L_{wb}/L_{wa})<70.$$

($L_{wb}/L_{wa}$) represents the ratio of the weight average fiber length of the organic fibers (B) to that of the inorganic fibers (A). By adjusting the length of the inorganic fibers (A) to the above-described range and also adjusting the ratio to a preferred range, the impact properties can be improved efficiently together with the reinforcing effect by the inorganic fibers (A).

That is, when $L_{wb}/L_{wa}$ is more than 8, it means that the organic fibers (B) are relatively long to the inorganic fibers (A). At this time, since the advance of the crack in the molded article progresses to bypass the organic fibers (B), the distance of crack advance can be increased. As a result, the range of crack advance can be propagated over a wide range in the molded article, and impact energy can be dispersed over a wide range. For this reason, it becomes easy to prevent brittle fracture of the molded article, and more energy can be absorbed by the entire molded article so that it is possible to increase the punch absorbing energy when punched. This effect is particularly effective for large molded articles having a large impact area. $L_{wb}/L_{wa}$ is preferably 9 or more, more preferably 10 or more, and most preferably 12 or more.

On the other hand, making $L_{wb}/L_{wa}$ less than 70 means that the organic fibers (B) in the molded article is prevented from becoming too long relative to the inorganic fibers (A). And, in the molded article, since only the organic fibers (B) existing with an extremely long length and excessive entanglement of the fibers can be prevented, the fiber reinforcing effect of the inorganic fibers (A) is effectively exhibited, and the flexural strength and impact properties of the molded article can be made excellent. $L_{wb}/L_{wa}$ is more preferably 50 or less, further preferably less than 40, and most preferably 30 or less. A molded article having $L_{wb}/L_{wa}$ in the above range can be easily adjusted by molding using a molding material described later.

Next, the form of the molding material will be described. The term "molding material" means a raw material used when a molded article is molded by injection molding or the like.

Figure 2:
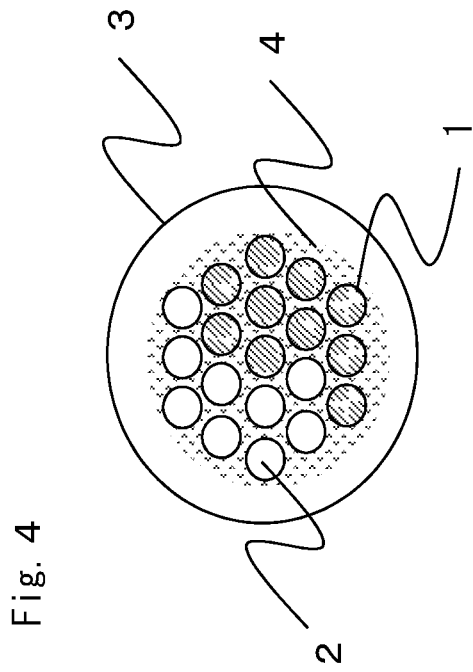
FIG. 2 is a schematic diagram showing a form in which organic fibers (B) contain inorganic fibers (A) in a molding material cross section.
Figure 3:
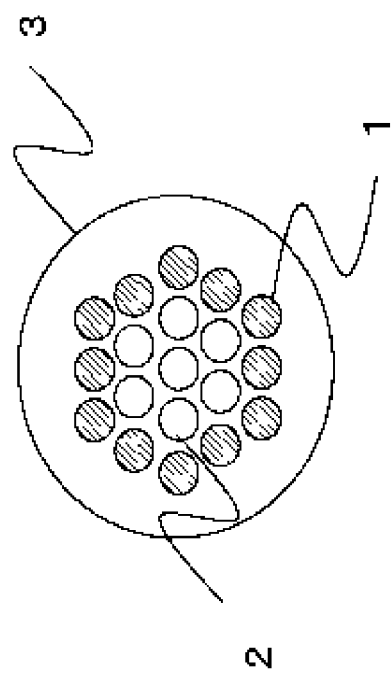
FIG. 3 is a schematic diagram showing a form in which a bundle of inorganic fibers (A) and a bundle of organic fibers (B) exist in a state separated by a boundary portion in a molding material cross section.
Figure 4:
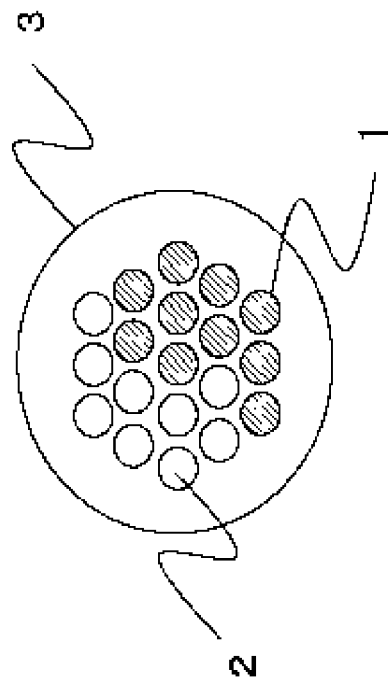
FIG. 4 is a schematic diagram showing a composite fiber bundle (E) in a form in which a component (D) is adhered to a fiber bundle composed of inorganic fibers (A) and organic fibers (B) in a molding material cross section.

A fiber reinforced thermoplastic resin molding material containing inorganic fibers (A), organic fibers (B), a thermoplastic resin (C), and a component (D) having a melt viscosity at 200° C. lower than that of the thermoplastic resin (C), the fiber reinforced thermoplastic resin molding material containing 5 to 45 parts by weight of the inorganic fibers (A), 1 to 45 parts by weight of the organic fibers (B), 10 to 93 parts by weight of the thermoplastic resin (C), and 1 to 20 parts by weight of the component (D), based on 100 parts by weight of the total of the inorganic fibers (A), the organic fibers (B), the thermoplastic resin (C), and the component (D) can be suitably used as a molding material to obtain the molded article. Although the specific shape of such a molding material will be described later, for example, columnar bodies having cross sections as shown in FIGS. 1 to 4 can be exemplified. FIGS. 1 to 3 show an example in which a thermoplastic resin (C) containing a component D is arranged around a fiber bundle composed of inorganic fibers (A) and organic fibers (B) (example in which no clear boundary exists between the component D and the thermoplastic resin (C)), and FIG. 4 shows an example in which the component (D) is arranged around the fiber bundle composed of the inorganic fibers (A) and the organic fibers (B), and the thermoplastic resin (C) is arranged on its further outer periphery.

As the inorganic fibers (A), organic fibers (B), and thermoplastic resin (C) in the molding material, (A) to (C) previously described for the molded article can be used, and those exemplified as other components for the molded article can also be contained. Moreover, those effects are as previously described. However, each of the inorganic fibers (A) and the organic fibers (B) may be bundled in the molding material at the stage before molding and, as described later, it is preferred that the length is substantially the same as the length as the molding material containing the fibers.

The component (D) having a melt viscosity at 200° C. lower than that of the thermoplastic resin (C) often has a low molecular weight, and is often liquid or a solid that is usually relatively brittle and easily crushed at room temperature. Since the component (D) has a low molecular weight, it has high fluidity and can enhance an effect of dispersing the inorganic fibers (A) and the organic fibers (B) in the thermoplastic resin (C). Examples of the component (D) include epoxy resins, phenol resins, terpene resins, cyclic polyarylene sulfide resins and the like. Two or more of these may be contained. As the component (D), those having a high affinity for the thermoplastic resin (C) are preferable. By selecting the component (D) having a high affinity for the thermoplastic resin (C), the component (D) is efficiently compatible with the thermoplastic resin (C) during production and molding of the molding material, thus the dispersibility of the inorganic fibers (A) and organic fibers (B) can be further improved.

The component (D) is appropriately selected according to the combination with the thermoplastic resin (C). For example, when the molding temperature is 150° C. to 270° C., a terpene resin is preferably used. When the molding temperature is 270° C. to 320° C., an epoxy resin, a phenol resin, or a cyclic polyarylene sulfide resin is preferably used. Specifically, when the thermoplastic resin (C) is a polypropylene resin, the component (D) is preferably a terpene resin. When the thermoplastic resin (C) is a polycarbonate resin or a polyarylene sulfide resin, the component (D) is preferably an epoxy resin, a phenol resin, or a cyclic polyarylene sulfide resin. When the thermoplastic resin (C) is a polyamide resin, the component (D) is preferably a terpene phenol resin.

The melt viscosity at 200° C. of the component (D) is preferably 0.01 to 10 Pa's. When the melt viscosity at 200° C. is 0.01 Pa's or more, a fracture starting from the component (D) is further suppressed, and the impact properties of the molded article can be further improved. The melt viscosity is more preferably 0.05 Pa-s or more, and further preferably 0.1 Pa's or more. On the other hand, when the melt viscosity at 200° C. is 10 Pa's or less, the component (D) can be easily impregnated into the inorganic fibers (A) and the organic fibers (B). For this reason, when the molding material is molded, the dispersibility of the inorganic fibers (A) and the organic fibers (B) can be further improved. The melt viscosity is preferably 5 Pa·s or less, and more preferably 2 Pa·s or less. The melt viscosity at 200° C. of the thermoplastic resin (C) and the component (D) can be measured with a viscoelasticity meter at 0.5 Hz using a 40-mm parallel plate.

As described later, in producing the molding material, it is preferable to obtain a composite fiber bundle (E) by adhering the component (D) to the inorganic fibers (A) and the organic fibers (B). The melting temperature (temperature in a melting bath) when supplying the component (D) is preferably 100 to 300° C. Therefore, attention was paid to the melt viscosity at 200° C. of the component (D) as an indicator of the impregnation of the component (D) into the inorganic fibers (A) and the organic fibers (B). When the melt viscosity at 200° C. is in the above preferred range, the component (D) is excellent in the impregnation into the inorganic fibers (A) and the organic fibers (B) in the preferred melting temperature range, thus the dispersibility of the inorganic fibers (A) and the organic fibers (B) in the molded article can be further improved, and the mechanical properties, particularly impact properties, of the molded article can be further improved.

The number average molecular weight of the component (D) is preferably 200 to 50,000. When the number average molecular weight is 200 or more, the mechanical properties, particularly impact properties, of the molded article can be further improved. The number average molecular weight is more preferably 1,000 or more. Also, when the number average molecular weight is 50,000 or less, the viscosity of the component (D) is appropriately low, so the component (D) is excellent in the impregnation into the inorganic fibers (A) and organic fibers (B) contained in the molded article, and the dispersibility of the inorganic fibers (A) and the organic fibers (B) in the molded article can be further improved. The number average molecular weight is more preferably 3,000 or less. The number average molecular weight of such a compound can be measured using gel permeation chromatography (GPC).

The component (D) preferably shows a weight loss on heating at the molding temperature, as measured at a heating rate of 10° C./min (in air), of 5% by weight or less. The weight loss on heating is more preferably 3% by weight or less. When the weight loss on heating is 5% by weight or less, generation of decomposition gas can be suppressed during impregnation of the inorganic fibers (A) and the organic fibers (B), allowing for suppression of void formation when molded. Moreover, generation of gas can be suppressed particularly in molding at a high temperature.

The weight loss on heating represents the weight reduction rate of the component (D) before and after heating under the above heating conditions, with respect to the weight of the compound (D) before heating, which is taken as 100%, and can be determined according to the equation below. The weights before and after heating can be determined by measuring the weight at the molding temperature by thermogravimetric analysis (TGA) using a platinum sample pan in an air atmosphere under the condition of a heating rate of 10° C./min.

Weight loss on heating [% by weight]={(Weight before heating−Weight after heating)/Weight before heating}×100.

Further, the rate of change in melt viscosity after heating at 200° C. for 2 hours of the component (D) is preferably 2% or less. By adjusting the rate of change in melt viscosity to 2% or less, even when producing a composite fiber bundle (E) over a long period of time, it is possible to suppress adhesion unevenness and stably produce the composite fiber bundle (E). The rate of change in melt viscosity is more preferably 1.5% or less, and further preferably 1.3% or less.

The rate of change in melt viscosity of the component (D) can be determined by the following method. First, the melt viscosity at 200° C. is measured with a viscoelasticity meter at 0.5 Hz using a 40-mm parallel plate. In addition, after leaving the component (D) in a hot air dryer at 200° C. for 2 hours, the melt viscosity at 200° C. is measured in the same manner, and the viscosity change rate is calculated by the equation below:

Rate of change in melt viscosity [%]={|(Melt viscosity at 200° C. before heating at 200° C. for 2 hours−Melt viscosity at 200° C. after heating at 200° C. for 2 hours)|/(Melt viscosity at 200° C. before heating at 200° C. for 2 hours)}×100.

The epoxy resin suitably used as the component (D) refers to a compound having two or more epoxy groups, in which the compound contains substantially no curing agent, and does not undergo curing due to so-called three-dimensional cross-linking even under heating. The epoxy resin has an epoxy group, thereby facilitating interaction with the inorganic fibers (A) and the organic fibers (B). Therefore, it facilitates compatibility with the inorganic fibers (A) and the organic fibers (B) constituting the composite fiber bundle (E) during impregnation, and the dispersibility of the inorganic fibers (A) and organic fibers (B) during the molding process is further improved.

Examples of the epoxy resin suitably used as the component (D) include glycidyl ether epoxy resins, glycidyl ester epoxy resins, glycidyl amine epoxy resins, and alicyclic epoxy resins. Two or more of these may be used.

Examples of the glycidyl ether epoxy resins include bisphenol A epoxy resins, bisphenol F epoxy resins, bisphenol AD epoxy resins, halogenated bisphenol A epoxy resins, bisphenol S epoxy resins, resorcinol epoxy resins, hydrogenated bisphenol A epoxy resins, phenol novolac epoxy resins, cresol novolac epoxy resins, aliphatic epoxy resins having an ether bond, naphthalene epoxy resins, biphenyl epoxy resins, biphenyl aralkyl epoxy resins, dicyclopentadiene epoxy resins and the like.

Examples of the glycidyl ester epoxy resins include hexahydrophthalic acid glycidyl ester, dimer acid diglycidyl ester and the like.

Examples of the glycidyl amine epoxy resins include triglycidyl isocyanurate, tetraglycidyl diaminodiphenylmethane, tetraglycidyl m-xylenediamine, aminophenol epoxy resins and the like.

Examples of the alicyclic epoxy resins include 3,4-epoxy-6-methylcyclohexylmethyl carboxylate, 3,4-epoxycyclohexylmethyl carboxylate and the like.

Among them, glycidyl ether epoxy resins are preferred, and bisphenol A type epoxy resins and bisphenol F type epoxy resins are more preferred because of excellent balance between viscosity and heat resistance.

In addition, the number average molecular weight of the epoxy resin used as the component (D) is preferably 200 to 5,000. When the number average molecular weight of the epoxy resin is 200 or more, the mechanical properties of the molded article can be further improved. The number average molecular weight of the epoxy resin is more preferably 800 or more, and further preferably 1,000 or more. On the other hand, when the number average molecular weight of the epoxy resin is 5,000 or less, the compound (D) is excellent in the impregnation into the inorganic fibers (A) and organic fibers (B) constituting the composite fiber bundle (E), and the dispersibility of the inorganic fibers (A) and the organic fibers (B) in the molded article can be further improved. The number average molecular weight is more preferably 4,000 or less, and further preferably 3,000 or less. The number average molecular weight of the epoxy resin can be measured using gel permeation chromatography (GPC).

Also, examples of the terpene resins include polymers or copolymers obtained by polymerization of terpene monomers, optionally with aromatic monomers, if necessary, in an organic solvent in the presence of a Friedel-Crafts catalyst.

Examples of the terpene monomers include α-pinene, β-pinene, dipentene, d-limonene, myrcene, allo-ocimene, ocimene, α-phellandrene, α-terpinene, γ-terpinene, terpinolene, 1,8-cineol, 1,4-cineol, α-terpineol, β-terpineol, γ-terpineol, sabinene, p-menthadienes, carenes, and the like. Further, examples of the aromatic monomers include styrene and α-methyl styrene. Among them, α-pinene, β-pinene, dipentene, and d-limonene are preferred because of excellent compatibility with the thermoplastic resin (C), and homopolymers of these terpene monomers are more preferred.

Moreover, a hydrogenated terpene resin obtained by hydrogenating these terpene resins, and a terpene phenol resin obtained by reacting a terpene monomer and phenols in the presence of a catalyst can also be used. As the phenols, those having on its benzene ring 1 to 3 substituents of at least one selected from the group consisting of alkyl groups, halogen atoms and hydroxyl groups are preferably used. Specific examples thereof include cresol, xylenol, ethylphenol, butylphenol, t-butylphenol, nonylphenol, 3,4,5-trimethylphenol, chlorophenol, bromophenol, chlorocresol, hydroquinone, resorcinol, orcinol and the like. Two or more of these may be used. Among these, phenol and cresol are preferred. Among these, hydrogenated terpene resins are preferable because they are more excellent in compatibility with the thermoplastic resin (C), particularly a polypropylene resin.

Also, the glass transition temperature of the terpene resin is preferably 30 to 100° C., but not particularly limited thereto. When the glass transition temperature is 30° C. or more, the handleability of the component (D) is excellent during the molding process. Further, when the glass transition temperature is 100° C. or less, the fluidity of the component (D) during the molding process is appropriately suppressed, and the moldability can be improved.

Also, the number average molecular weight of the terpene resin is preferably 200 to 5,000. When the number average molecular weight is 200 or more, the mechanical properties, particularly impact properties, of the molded article can be further improved. Further, when the number average molecular weight is 5,000 or less, the viscosity of the terpene resin is appropriately low, so it is excellent in the impregnation into the inorganic fibers (A) and the organic fibers (B), and the dispersibility of the inorganic fibers (A) and the organic fibers (B) in the molded article can be further improved. The number average molecular weight of the terpene resin can be measured using gel permeation chromatography (GPC).

The content of the component (D) in the molding material is preferably 1 to 20 parts by weight, based on 100 parts by weight of the total of the inorganic fibers (A), the organic fibers (B), the thermoplastic resin (C) and the component (D). When the content of the component (D) is less than 1 part by weight, the fluidity of the inorganic fibers (A) and the organic fibers (B) during production of the molded article is lowered and the dispersibility is deteriorated. The content of the component (D) is preferably 2 parts by weight or more, and preferably 4 parts by weight or more. On the other hand, when the content of the component (D) is more than 20 parts by weight, the flexural strength, tensile strength and impact properties of the molded article are lowered. The content of the component (D) is preferably 15 parts by weight or less, more preferably 12 parts by weight or less, and further preferably 10 parts by weight or less.

Examples of the molding material include columnar bodies having cross sections as shown in FIGS. 1 to 4 as specific shapes. In such a columnar body, it is preferred that the inorganic fibers (A) and the organic fibers (B) are aligned almost parallel to the axial direction of the columnar body, and the lengths of the inorganic fibers (A) and the organic fibers (B) are substantially the same as the length of the molding material. Since the length of the fibers is substantially the same as the length of the molding material, the fiber lengths of the inorganic fibers (A) and the organic fibers (B) in the molded article to be produced using the same are easily controlled and can be made relatively long, a molded article having more excellent mechanical properties can be obtained. The phrase "arranged almost parallel" refers to a state in which an axis line of the major axis of the fiber bundle containing the inorganic fibers (A) and the organic fibers (B) and an axis line of the major axis of the molding material are directed to the same direction, and an angle of deviation between the axis lines is preferably 20° or less, more preferably 10° or less, and further preferably 5° or less. The length of the molding material is a length in the fiber bundle alignment direction in the molding material, and in the example of the columnar body as described above, it is a length in the major axis direction of the columnar body. Further, the phrase "substantially the same length" refers that the fiber bundle is not cut intentionally in the molding material, or that the fiber bundle significantly shorter than the overall length of the molding material is substantially not contained. Although the amount of the fiber bundle shorter than the overall length of the molding material is not particularly limited, the content of the fiber bundle having a length that is 50% or less of the overall length of the molding material is preferably 30% by mass or less, and more preferably 20% by mass or less of all fiber bundles. More preferably, the content of the fiber bundle having a length of 85% or more of the overall length of the molding material is preferably 80% by mass or more, and more preferably 90% by mass or more.

The molding material preferably has substantially the same cross-sectional shape continuously in the longer direction for a certain length. The length of the molding material is 8 mm to 14 mm. When the length of the molding material is less than 8 mm, the reinforcing effect of the fibers is poor. In other words, when molding using a molding material of less than 8 mm, the weight average fiber length of the organic fibers in the obtained molded article cannot be made sufficiently long so that it is inferior in the impact properties. The molding material is preferably 8.5 mm or more, more preferably 9 mm or more, and further preferably 10 mm or more. On the other hand, when the molding material is more than 14 mm, moldability during injection molding is lowered. In other words, when the length of the molding material is more than 14 mm, the molding material is long so that the molding material does not bite into an injection molding machine. Therefore, the moldability is lowered. The molding material is preferably 12 mm or less, and more preferably 11 mm or less.

In addition, in the molding material having the above-described configuration, when a molded article is obtained by injection molding under conditions of a back pressure of 3 MPa and an injection speed of 30 mm/s, the weight average fiber length $L_{wb}$ of the organic fibers (B) in the molded article is likely to be 60% or more of the molding material length that is a starting material. When $L_{wb}$ is 60% or more of the molding material length, the fiber reinforcing effect of the organic fibers (B) in the molded article is easily exhibited, and the impact properties of the molded article are improved. L is more preferably 70% or more. In the examples described later, $L_{wb}$ in an ISO dumbbell specimen is measured, but the molded article is not limited thereto.

It is preferable that the molding material has a fiber bundle containing the inorganic fibers (A) and the organic fibers (B) that are continuous fiber bundles in the thermoplastic resin (C). In other words, it is preferable to have a configuration in which the thermoplastic resin (C) is arranged outside the fiber bundle. The thermoplastic resin (C) may contain the component (D), or a composite fiber bundle (E) filled with the component (D) between each single fiber of the fiber bundle may be configured, and the thermoplastic resin (C) may be arranged outside the composite fiber bundle (E). The composite fiber bundle (E) is obtained by impregnating the fiber bundle with the component (D), and is in a state that the inorganic fibers (A) and the organic fibers (B) are dispersed like islands in the sea of the component (D).

The molding material preferably has a core-in-sheath structure in which the fiber bundle or the composite fiber bundle (E) is coated with the thermoplastic resin (C). The thermoplastic resin (C) to be a sheath structure may further contain other components if necessary to form a thermoplastic resin composition. The term "coated structure" refers to a structure in which a composition containing the thermoplastic resin (C) (hereinafter sometimes referred to simply as "thermoplastic resin (C)" also in a composition) is arranged and adhered to the surface of the fiber bundle or composite fiber bundle (E).

The component (D) contained in the molding material often has a low molecular weight, and is often liquid or a solid that is usually relatively brittle and easily crushed at room temperature. The structure in which the thermoplastic resin (C) is contained at the outer side of the composite fiber bundle (E) allows the thermoplastic resin (C) having a high molecular weight to protect the composite fiber bundle (E), to prevent the crushing, scattering and the like of the component (D) due to impact, abrasion and the like during conveyance and handling of the molding material, and to retain the shape of the molding material. From the viewpoint of handleability, the molding material preferably retains the aforementioned shape until being subjected to molding.

The composite fiber bundle (E) and the thermoplastic resin (C) may be in a state where the thermoplastic resin (C) partially enters a portion of the composite fiber bundle (E) and is compatible with each other at or near their interface, or a state where the composite fiber bundle (E) is impregnated with the thermoplastic resin (C).

It is preferred that the inorganic fibers (A) and the organic fibers (B) are unevenly distributed in a fiber bundle cross section. The fiber bundle cross section refers to a cross section perpendicular to the longer direction of fiber of the fiber bundle. In the fiber bundle cross section, the inorganic fibers (A) and the organic fibers (B) are unevenly distributed to prevent the entanglement of the inorganic fibers (A) and the organic fibers (B) during molding so that a molded article in which the inorganic fibers (A) and the organic fibers (B) are uniformly dispersed can be obtained. For this reason, the impact properties of the molded article can be further improved. The term "unevenly distributed" refers that, in the fiber bundle cross section, the inorganic fibers (A) and the organic fibers (B) are not evenly present throughout the entire region, but present unevenly at some parts. Examples of "unevenly distributed" include: so-called core-in-sheath structures such as a form where the inorganic fibers (A)1 envelop the organic fibers (B)2 in the fiber bundle cross section, as shown in FIG. 1, and a form where the organic fibers (B)2 envelop the inorganic fibers (A)1, as shown in FIG. 2; a structure in which a bundle of the inorganic fibers (A)1 and a bundle of the organic fibers (B)2 exist in a state separated by a certain boundary portion in the fiber bundle cross section, as shown in FIG. 3 and the like. The term "envelop" refers to an example in which the inorganic fibers (A) are arranged in the core and the organic fibers (B) in the sheath, an example in which the organic fibers (B) are arranged in the core and the inorganic fibers (A) in the sheath, or the like. In the example shown in FIG. 3, at least a portion of the inorganic fibers (A) and at least a portion of the organic fibers (B) are both in contact with the thermoplastic resin (C)3 at the outer layer in the fiber bundle cross section. At this time, the examples where the inorganic fibers (A) or the organic fibers (B) are in contact with the thermoplastic resin (C)3 are intended to include examples where the inorganic fibers (A) or the organic fibers (B) are in contact with the thermoplastic resin (C)3 via the component (D), as shown in FIG. 4.

Examples of a method of confirming that the inorganic fibers (A) and the organic fibers (B) are unevenly distributed in the fiber bundle include a method of observing a cross section perpendicular to the longer direction of fiber of the molding material with an optical microscope set at a magnification of 300 times, performing image processing of the obtained microscopic image, and analyzing it.

Examples of a method of unevenly distributing the inorganic fibers (A) and the organic fibers (B) in the cross section of the fiber bundle include a method of preparing the molding material by aligning a bundle of the inorganic fibers (A) and a bundle of the organic fibers (B). By preparing a molding material by aligning each of the bundles, the inorganic fibers (A) and the organic fibers (B) exist as independent fiber bundles, and can be unevenly distributed. Increasing the number of single fibers in the bundle of the inorganic fibers (A) and the bundle of the organic fibers (B) can increase the size of bundle, and reducing the number of single fibers can reduce the size of bundle and, in this manner, it is possible to allow the fibers (A) and (B) to be unevenly distributed while varying the size of the bundles.

When carbon fibers are used as the inorganic fibers (A), there is no particular limitation, but it is preferable to use a fiber bundle of 100 to 350,000 carbon fibers. From the viewpoint of productivity, it is more preferable to use a fiber bundle of 20,000 to 100,000 carbon fibers. On the other hand, when polyester fibers, polyphenylene sulfide fibers, liquid crystal polyester fibers or the like are used as the organic fibers (B), there is no particular limitation, but it is preferable to use a fiber bundle of 1 to 2,000 fibers. From the viewpoint of productivity and preventing the entanglement of the fibers in the molded article, it is more preferable to use a fiber bundle of 10 to 1,000 fibers, and it is further preferable to use a fiber bundle of 30 to 700 fibers.

By molding using the above molding material, a molded article having excellent dispersibility of the inorganic fibers (A) and organic fibers (B), and excellent flexural strength and impact properties can be obtained.

Then, the production method of the molding material will be described. The molding material can be obtained, for example, by the following method.

First, a roving of inorganic fibers (A) and a roving of organic fibers (B) are doubled in parallel to the longer direction of fiber to prepare a fiber bundle having the inorganic fibers (A) and the organic fibers (B). Subsequently, the fiber bundle is impregnated with a molten component (D) to prepare a composite fiber bundle (E). Further, the composite fiber bundle (E) is guided to an impregnation die filled with a composition containing the molten thermoplastic resin (C) to coat the outer surface of the composite fiber bundle (E) with the thermoplastic resin (C), and pultruded through a nozzle. After cooling and solidifying the pultruded product, the resulting product was pelletized to a predetermined length to obtain a molding material (form I). The thermoplastic resin (C) may be impregnated in the fiber bundle as long as it is disposed at least outside the composite fiber bundle (E).

A molding material in which the composite fiber bundle (E) is coated with the thermoplastic resin (C) prepared by the above method, and pellets containing the thermoplastic resin (C) (not containing the inorganic fibers (A) and the organic fibers (B)) may be pellet-blended to obtain a molding material mixture. Thereby, the content of the inorganic fibers (A) and the organic fibers (B) in the molded article can be easily adjusted. In addition, pellet-blending, unlike melt-kneading, refers to stirring and mixing a plurality of materials at a temperature at which the resin component does not melt to make them substantially uniform state, and it is preferably used when a pellet-shaped molding material is used, mainly injection molding, extrusion molding and the like.

We also include a molding material obtained by pellet-blending a pellet in which the inorganic fibers (A) are coated with the thermoplastic resin (C) and a pellet in which the organic fibers (B) are coated with the same or different thermoplastic resin (C) as the previous pellet (form II). In this example, the component (D) is more preferably impregnated into at least the inorganic fibers (A). Specifically, for example, it is preferable to separately prepare an inorganic fiber reinforced thermoplastic resin molding material (X) (sometimes referred to as "inorganic fiber reinforced molding material (X)") containing at least the inorganic fibers (A), the thermoplastic resin (C) and the component (D), and an organic fiber reinforced thermoplastic resin molding material (Y) (sometimes referred to as "organic fiber reinforced molding material (Y)") containing at least the organic fibers (B), a thermoplastic resin (F) and a component (G), and pellet-blend them.

It is preferred that the inorganic fiber reinforced molding material (X) includes a composite fiber bundle (H) obtained by impregnating the inorganic fibers (A) with the component (D), and has a structure in which the thermoplastic resin (C) is contained at the outer side of the composite fiber bundle (H). The inorganic fibers (A) are preferably arranged almost parallel to the axial direction of the inorganic fiber reinforced molding material (X), and the length of the inorganic fiber reinforced molding material (X) is preferably 8 to 14 mm. At the same time, the length of the inorganic fibers (A) and the length of the inorganic fiber reinforced molding material (X) are preferably substantially the same.

It is preferred that the organic fiber reinforced molding material (Y) includes a composite fiber bundle (I) obtained by impregnating the organic fibers (B) with the component (G), and has a structure in which the thermoplastic resin (F) is contained at the outer side of the composite fiber bundle (I). In addition, as the component (G), the compound exemplified in the component (D) previously described can also be used and, in this example, the component (D) and the component (G) may be the same compound or different compounds. As the thermoplastic resin (F), the resin exemplified in the previously described thermoplastic resin (C) can be used, and the thermoplastic resin (C) and the thermoplastic resin (F) may be the same compound or different compounds.

The organic fibers (B) are preferably arranged almost parallel to the axial direction of the organic fiber reinforced molding material (Y), and the length of the organic fiber reinforced molding material (Y) is preferably 8 to 14 mm. At the same time, the length of the organic fibers (B) and the length of the organic fiber reinforced molding material (Y) are preferably substantially the same.

The phrase "arranged almost parallel" refers to a state in which, in each of the inorganic fiber reinforced molding material (X) and the organic fiber reinforced molding material (Y), an axis line of the major axis of the fiber bundle and an axis line of the major axis of the molding material containing them are directed in the same direction, and an angle of deviation between the axis lines is preferably 20° or less, more preferably 10° or less, and further preferably 5° or less. In addition, the phrase "substantially the same length" refers that, in each of the inorganic fiber reinforced molding material (X) and the organic fiber reinforced molding material (Y), the content of the fiber bundle having a length of 50% or less of the overall length of the molding material is 30% by mass or less, and more preferably 20% by mass or less of all fiber bundles. More preferably, the content of the fiber bundle having a length of 85% or more of the overall length is preferably 80% by mass or more, and further preferably 90% by mass or more.

The inorganic fiber reinforced molding material (X) preferably contains 5 to 45 parts by weight of the inorganic fibers (A), 10 to 94 parts by weight of the thermoplastic resin (C), and 1 to 20 parts by weight of the component (D), based on 100 parts by weight of the total of the inorganic fibers (A), the thermoplastic resin (C), and the component (D). The organic fiber reinforced molding material (Y) preferably contains 1 to 45 parts by weight of the organic fibers (B), 10 to 98 parts by weight of the thermoplastic resin (F), and 1 to 20 parts by weight of the component (G), based on 100 parts by weight of the total of the organic fibers (B), the thermoplastic resin (F), and the component (G).

Then, it is preferred to blend 50 to 80 parts by weight of the inorganic fiber reinforced molding material (X), and 20 to 50 parts by weight of the organic fiber reinforced molding material (Y), based on 100 parts by weight of the total of the inorganic fiber reinforced molding material (X) and the organic fiber reinforced molding material (Y). Furthermore, when the inorganic fiber reinforced molding material (X) and the organic fiber reinforced molding material (Y) are formed into a pellet blend (mixture), as a whole mixture, it is preferable to contain 5 to 45 parts by weight of the inorganic fibers (A), 1 to 45 parts by weight of the organic fiber (B), 10 to 93 parts by weight of the thermoplastic resin (C), and 1 to 20 parts by weight of the component (D), based on 100 parts by weight of the total of the inorganic fibers (A), the organic fibers (B), the thermoplastic resin (C), and the component (D). In calculating such a ratio, when a thermoplastic resin used as the thermoplastic resin (F) is included as the thermoplastic resin (C) and one falls under the component (D) is used as the component (G), the component (G) is included as the component (D).

Next, a method of producing the molded article will be described.

By molding using the molding material described above, a molded article having excellent dispersibility of the inorganic fibers (A) and organic fibers (B), and excellent flexural strength and impact properties can be obtained. As the molding method, a molding method using a mold is preferable, and various molding methods such as injection molding, extrusion molding, and press molding can be used. In particular, a stable molded article can be continuously obtained by a molding method using an injection molding machine. The conditions for injection molding are not particularly limited, but, for example, the injection time is preferably 0.5 seconds to 10 seconds, and more preferably 2 seconds to 10 seconds. The back pressure is preferably 0.1 MPa or more, more preferably 1 MPa or more, further preferably 2 MPa or more, and most preferably 3 MPa or more. Also, the upper limit is preferably 50 MPa or less, more preferably 30 MPa or less, further preferably 20 MPa or less, and most preferably 10 MPa or less. The injection speed is preferably 1 mm/s to 200 mm/s, more preferably 10 mm/s to 150 mm/s, and further preferably 20 mm/s to 100 mm/s. The screw rotation speed is preferably 10 rpm to 200 rpm, more preferably 30 rpm to 150 rpm, and further preferably 50 rpm to 100 rpm. The holding pressure is preferably 1 MPa to 50 MPa, and more preferably 1 MPa to 30 MPa. The holding time is preferably 1 second to 20 seconds, and more preferably 5 seconds to 20 seconds. The cylinder temperature is preferably 200° C. to 320° C., and the mold temperature is preferably 20° C. to 100° C. The cylinder temperature indicates the temperature of a portion at where the molding material of the injection molding machine is heated and melted, and the mold temperature indicates the temperature of a mold into which a resin is injected to be formed into a predetermined shape. By appropriately selecting these conditions, particularly, the injection time, back pressure and mold temperature, the fiber lengths of the inorganic fibers such as carbon fibers and the organic fibers in the molded article can be easily adjusted.

The molded article obtained as described above is excellent in mechanical properties, particularly, flexural strength and impact properties.

EXAMPLES

Hereinafter, our articles and materials will be more specifically described with reference to examples, but this disclosure is not limited to the description of these examples. First, a method of evaluating various characteristics will be described.

(1) Measurement of Melt Viscosity

For the thermoplastic resin (C) and the component (D) used in each of Examples and Comparative Examples, the melt viscosity at 200° C. was measured with a viscoelasticity meter at 0.5 Hz using a 40-mm parallel plate.

(2) Measurement of Weight Average Fiber Length

The ISO dumbbell specimen obtained in each of Examples and Comparative Examples was heated in a state sandwiched between glass plates on a hot stage set to 200 to 300° C. to form a film in which fibers are uniformly dispersed. The film in which the inorganic fibers (A) and the organic fibers (B) were uniformly dispersed was observed with an optical microscope (50 to 200 times). The fiber lengths of randomly selected 1,000 inorganic fibers (A) and similarly randomly selected 1,000 organic fibers (B) were measured, and the weight average fiber length was calculated according to the equation below:

$$\text{Average fiber length} = \Sigma(Mi^2 \times Ni)/\Sigma(Mi \times Ni)$$

Mi: Fiber length (mm)
Ni: Number of fibers with a fiber length Mi.

(3) Measurement of Flexural Strength of Molded Article

For the ISO dumbbell specimen obtained in each of Examples and Comparative Examples, the flexural strength was measured in accordance with ISO 178 using a 3-point bend fixture (indenter radius: 5 mm) at a fulcrum distance of 64 mm, under test conditions of a testing speed of 2 mm/min. "INSTRON" (registered trademark) universal tester model 5566 (manufactured by Instron) was used as a tester. The measurement was performed three times, and the average value thereof was calculated as the flexural strength of each of Examples and Comparative Examples.

(4) Measurement of Charpy Impact Strength of Molded Article

A parallel portion of the ISO dumbbell specimen obtained in each of Examples and Comparative Examples was cut out, and a V-notch Charpy impact test was performed in accordance with ISO179, using a C1-4-01 model tester manufactured by Tokyo Testing Machine Inc. The measurement was performed 5 times, and the average value thereof was calculated as the impact strength ($kJ/m^2$) of each of Examples and Comparative Examples.

(5) Evaluation of Fiber Dispersibility in Molded Article

For a specimen of 80 mm×80 mm×3 mm in thickness obtained in each of Examples and Comparative Examples, the number of undispersed inorganic fiber bundles (CF bundles) existing on the front and back surfaces was visually counted. The evaluation was performed on 50 molded articles, the fiber dispersibility was determined by the total number according to the following criteria, and A and B were determined to be acceptable:
A: Less than 1 undispersed CF bundle
B: 1 or more undispersed CF bundles
C: 3 or more undispersed CF bundles.

(6) Evaluation of Moldability During Injection Molding

Regarding the moldability of the molding material used in each of Examples and Comparative Examples, a time after the molding material started to bite into a screw of an injection molding machine until the screw moves to a specified metering position and the metering was completed was counted. Determination was made according to the following criteria, and A was determined to be acceptable:
A: Metering time is less than 120 seconds
B: Metering time is 120 seconds or more.

(7) Measurement of Absorbed Energy by Molded Article in Falling Weight Impact Test For the specimen of 80 mm×80 mm×3 mm obtained in each of Examples and Comparative Examples, a falling weight impact test was performed using a tap with round weight tip (φ 20 mm) under the conditions of: a weight mass of 15 kg; a falling weight speed of 4.4 m/sec; and a test temperature of 23° C., to measure the absorbed energy (J) in the falling weight impact test. The measurement was performed three times, and the average value thereof was calculated as the absorbed energy (J) in the falling weight impact test of each of Examples and Comparative Examples.
(8) Evaluation of Scattering Prevention of Molded Article For the specimen of 80 mm×80 mm×3 mm obtained in each of Examples and Comparative Examples, a falling weight impact test was performed under the conditions shown in (7) above, and was determined based on the scattering situation after the test. Determination of scattering prevention was performed according to the following criteria, and A and B were determined to be acceptable. The measurement was performed three times, and the scattering situation with the largest number among them was taken as the scattering prevention evaluation result of each of Examples and Comparative Examples.
- A: The molded article is not destroyed (It means that the molded article is not divided into two or more. This category includes an example where the molded article is cracked.)
- B: The molded article is divided into two
- C: The molded article is divided into three or more (that is, this category includes an example where the molded article becomes three or more fragments)

(9) Punch Collision Test

For a 800 mm×400 mm×150 mm box-shaped and 2.5 mm-thick large molded article obtained in each of Examples and Comparative Examples, using a prismatic block type striker (100 mm×100 mm), a collision test was performed by punching the striker on a surface of 800 mm×400 mm, under the conditions of: a striker mass of 15 kg; a collision speed of 5.0 m/sec; and a test temperature of 23° C. The magnitude of the absorbed energy was determined by the area punched by the striker. The magnitude of the absorbed energy in collision was determined according to the following criteria, and A and B were determined to be acceptable. The measurement was performed three times, and the time with the largest punched area was used for the evaluation of the punch absorbed energy in each of Examples and Comparative Examples.
- A: The punched area is larger than the striker cross-sectional area.
- B: The punched area is the same as the striker cross-sectional area, and when viewing only the punched part, it is not cracked or divided into multiple parts.
- C: The punched area is the same as the striker cross-sectional area, and when viewing only the punched part, it is cracked.
- D: The punched area is the same as the striker cross-sectional area, and when viewing only the punched part, it is divided into multiple parts.

Preparation of Inorganic Fibers (A)

A copolymer mainly composed of polyacrylonitrile was subjected to spinning, firing, and surface oxidation to obtain continuous carbon fibers with a total single yarn count of 24,000, a single fiber diameter of 7 μm, a mass per unit length of 1.6 g/m, a specific gravity of 1.8 g/cm$^3$, and an oxygen concentration ratio of surfaces [O/C] of 0.2. These continuous carbon fibers had a strand tensile strength of 4,880 MPa and a strand tensile modulus of 225 GPa. Subsequently, a mother liquor of a sizing agent was prepared by dissolving glycerol polyglycidyl ether as a polyfunctional compound in water to 2% by weight, and the sizing agent was applied to the carbon fibers by a dipping method and dried at 230° C. The sizing agent adhesion amount on the carbon fibers thus obtained was 1.0% by weight.

Organic Fibers (B)
(B-1)
Polyester fibers ("TETORON" (registered trademark) 2200T-480-705M manufactured by Toray Industries, Inc., single fiber fineness: 4.6 dtex, melting point: 260° C.) were used.
(B-2)
Polyphenylene sulfide fibers ("TORCON" (registered trademark) 400T-100-190 manufactured by Toray Industries, Inc., single fiber fineness: 4.0 dtex, melting point: 285° C.) were used.
(B-3)
Polytetrafluoroethylene fibers ("TOYOFLON" (registered trademark) 440T-60F-S290-M190 manufactured by Toray Industries, Inc., single fiber fineness: 7.3 dtex, melting point: 327° C.) were used.
(B-4)
Liquid crystal polyester fibers ("SIVERAS" (registered trademark) 1700T-288f manufactured by Toray Industries, Inc., single fiber fineness: 5.7 dtex, melting point: 330° C.) were used.

Thermoplastic Resin (C)
(C-1)
A pellet blend of a polypropylene resin ("PRIME POLYPRO" (registered trademark) J137G manufactured by Prime Polymer Co., Ltd.) and a maleic acid-modified polypropylene resin ("ADMER" (registered trademark) QE840 manufactured by Mitsui Chemicals, Inc.) blended at a weight ratio of 85/15 was used. As a result of measuring the melt viscosity at 200° C. by the method described in (1) above, it was 50 Pa·s.
(C-2)
A polycarbonate resin ("PANLITE" (registered trademark) L-1225L manufactured by Teijin Chemicals Limited) was used. As a result of measuring the melt viscosity at 200° C. by the method described in (1) above, it was 14000 Pa-s.
(C-3)
A polyphenylene sulfide resin ("TORELINA (registered trademark)" M2888 manufactured by Toray Industries, Inc.) was used. As a result of measuring the melt viscosity by the method described in (1) above, except that the measurement temperature was changed to 310° C., it was 50 Pa·s.

Component (D)
(D-1)
A solid hydrogenated terpene resin ("CLEARON" (registered trademark) P125 manufactured by Yasuhara Chemical Co., Ltd., softening point: 125° C.) was used. This resin was put into a tank in an impregnation aid applicator, and the temperature in the tank was set at 200° C. to heat the resin for 1 hour to make the resin in a molten state. As a result of measuring the melt viscosity at 200° C. at this time by the method described in (1) above, it was 1 Pa-s, and as a result of calculating the rate of change in melt viscosity, it was 1.2%.
(D-2)
A solid bisphenol A type epoxy resin (jER1004AF (E-2) manufactured by Mitsubishi Chemical Corporation, softening point: 97° C.) was used as the component (D) when a polycarbonate resin was used as the thermoplastic resin (C). As a result of measuring the melt viscosity by the method described in (1) above in the same manner as P125 described above, it was 1 Pa·s, and as a result of calculating the rate of change in melt viscosity, it was 1.1%.

Example 1

Using an apparatus for producing filament-reinforced resin pellets provided with a coating die for wire coating at the end of a TEX-30a model twin-screw extruder (screw diameter: 30 mm, L/D=32) manufactured by The Japan Steel Works, LTD., the cylinder temperature of the extruder was set at 220° C., and the thermoplastic resin (C-1) shown above was supplied from a main hopper, and melt-kneaded at a screw rotation speed of 200 rpm. The compound (D-1) which had been melted by heating at 200° C. was applied to a fiber bundle composed of the inorganic fibers (A) and the organic fibers (B-1) to form a composite fiber bundle (E) while adjusting the discharge amount of the compound (D-1) was adjusted such that the amount was 8.7 parts by weight based on 100 parts by weight of the total of the components (A) to (C) (8.0 parts by weight based on 100 parts by weight of the total of the components (A) to (D)). Thereafter, the composite fiber bundle (E) was supplied to a die port (3 mm in diameter) from which a composition containing the molten thermoplastic resin (C-1) was discharged so that surroundings of the inorganic fibers (A) and the organic fibers (B-1) was coated continuously with the composition containing the thermoplastic resin (C-1). In an internal cross section of the composite fiber bundle (E) at this time, the inorganic fibers (A) and the organic fibers (B-1) were unevenly distributed. In the uneven distribution state as shown in FIG. 3, at least a portion of the inorganic fibers (A) and at least a portion of the organic fibers (B-1) were in contact with the composition containing the thermoplastic resin (C-1). The resulting strand was cooled and then cut with a cutter into pellets with a length of 8 mm to obtain filament pellets. At this time, the take-up speed was adjusted such that the inorganic fibers (A) was 20 parts by weight, and the organic fibers (B-1) was 5 parts by weight based on 100 parts by weight of the total of the components (A) to (C). The lengths of the inorganic fibers (A) and the organic fibers (B-1) of the resulting filament pellets were substantially the same as the pellet length. The uneven distribution state was analyzed by observing a cross section perpendicular to the longer direction of fiber of the resulting filament pellets with an optical microscope set at a magnification of 300 times, and performing image processing of the obtained microscopic image.

The filament pellets thus obtained were subjected to injection molding, using an injection molding machine (J10AD manufactured by Japan Steel Works, LTD.) under the conditions of: an injection time of 2 seconds; a back pressure of 5 MPa; a holding pressure of 20 MPa; a pressure holding time of 10 seconds; an injection speed of 30 mm/s, a screw rotation speed of 80 rpm; a cylinder temperature of 230° C.; and a mold temperature of 60° C., to prepare an ISO dumbbell specimen (type A1) and a specimen of 80 mm×80 mm×3 mm, as molded articles. The cylinder temperature indicates the temperature of a portion where the molding material of the injection molding machine is heated and melted, and the mold temperature indicates the temperature of a mold into which a resin is injected to be formed into a predetermined shape. The properties of the resulting specimens (molded articles) were evaluated after allowing them to stand in a constant temperature and humidity room conditioned at a temperature of 23° C. and 50% RH for 24 hours. The evaluation was carried out according to the methods described above, and the evaluation results are summarized in Table 1.

Further, the resulting filament pellets were subjected to injection molding, using an injection molding machine (J1300E-C3, manufactured by Japan Steel Works, LTD.) under the conditions of: an injection time of 10 seconds; a back pressure of 5 MPa; an injection speed of 100 mm/sec; a cylinder temperature of 230° C.; and a mold temperature of 80° C., to prepare a 800 mm×400 mm×150 mm box-shaped and 2.5 mm-thick large molded article. The properties of the resulting large molded article were evaluated after allowing them to stand in a constant temperature and humidity room conditioned at a temperature of 23° C. and 50% RH for 24 hours. The evaluation was carried out according to the methods described above, and the evaluation results are summarized in Table 1.

Examples 2 to 4

Molded articles were prepared and evaluated in the same manner as in Example 1 except that the composition ratio or the fiber type used was changed as shown in Table 1. The evaluation results are summarized in Table 1.

Example 5

A molded article was prepared and evaluated in the same manner as in Example 1 except for changing the thermoplastic resin (C) to (C-2), the organic fibers (B) to (B-3), and the component (D) to (D-2), and further changing the cylinder temperature to 300° C. and the mold temperature to 80° C. The evaluation results are summarized in Table 1.

Example 6

A molded article was prepared and evaluated in the same manner as in Example 1 except for changing the thermoplastic resin (C) to (C-2), the organic fibers (B) to (B-4), and the component (D) to (D-2), and further changing the cylinder temperature to 300° C. and the mold temperature to 80° C. The evaluation results are summarized in Table 1.

Example 7

A molded article was prepared and evaluated in the same manner as in Example 1 except for changing to be 20 parts by weight of the organic fibers (B-1) and 13.9 parts by weight of the component (D) based on 100 parts by weight of the total of the components (A) to (C) (20 parts by weight of the organic fibers (B-1) and 12.2 parts by weight of the component (D) based on 100 parts by weight of the total of the components (A) to (D)). The evaluation results are summarized in Table 1.

Example 8

A molded article was prepared and evaluated in the same manner as in Example 1 except for changing the thermoplastic resin (C) to (C-3), the organic fibers (B) to (B-3), and the component (D) to (D-2), and further changing the cylinder temperature to 330° C. and the mold temperature to 130° C. The evaluation results are summarized in Table 1.

Example 9

A molded article was prepared and evaluated in the same manner as in Example 1 except that the pellet length of the filament pellet was changed to 14 mm. The evaluation results are summarized in Table 1.

Example 10

A molded article was prepared and evaluated in the same manner as in Example 1 except that the pellet length of the filament pellet was changed to 14 mm and the organic fibers (B) were changed to (B-4). The evaluation results are summarized in Table 1.

Example 11

Molded articles were prepared and evaluated in the same manner as in Example 1 except that the composition ratio or the fiber type used was changed as shown in Table 1. The evaluation results are summarized in Table 1.

Example 12

A molded article was prepared and evaluated in the same manner as in Example 1 except that the back pressure during the injection molding was changed to 15 MPa and the composition ratio or fiber type used was changed as shown in Table 2. The evaluation results are summarized in Table 2.

Example 13

A molded article was prepared and evaluated in the same manner as in Example 1 except that the back pressure during the injection molding was changed to 1 MPa and the composition ratio or fiber type used was changed as shown in Table 2. The evaluation results are summarized in Table 2.

Example 14

A molded article was prepared and evaluated in the same manner as in Example 6 except that the back pressure during the injection molding was changed to 15 MPa. The evaluation results are summarized in Table 2.

Example 15

A molded article was prepared and evaluated in the same manner as in Example 1 except that the pellet length of the filament pellet was changed to 14 mm, the organic fibers (B) were changed to (B-4), and further the back pressure during the injection molding was set to 1 MPa. The evaluation results are summarized in Table 2.

Example 16

A molded article was prepared and evaluated in the same manner as in Example 1 except that the back pressure during the injection molding of the ISO dumbbell specimen and large molded article was set to 15 MPa and the injection speed was set to 100 mm/s. The evaluation results are summarized in Table 2.

Example 17

A molded article was prepared and evaluated in the same manner as in Example 1 except that the pellet length of the filament pellet was changed to 19 mm, and further the back pressure during the injection molding was set to 1 MPa. The evaluation results are summarized in Table 2.

Comparative Examples 1 to 3

Molded articles were prepared and evaluated in the same manner as in Example 1 except that the composition was changed as shown in Table 3. The evaluation results are summarized in Table 3.

Comparative Example 4

A molded article was prepared and evaluated in the same manner as in Example 1 except that the back pressure during the injection molding was set to 20 MPa. The evaluation results are summarized in Table 3.

Comparative Example 5

A molded article was prepared and evaluated in the same manner as in Example 1 except that the pellet length of the filament pellet was set to 25 mm. However, since the pellet length of the filament pellet was increased, the pellet did not bite into the screw of the injection molding machine and could not be molded. The conditions are summarized in Table 3.

Comparative Example 6

A molded article was prepared and evaluated in the same manner as in Example 1 except that the pellet length of the filament pellet was set to 20 mm. However, since the pellet length of the filament pellet was increased, the pellet did not bite into the screw of the injection molding machine and could not be molded. The conditions are summarized in Table 3.

Comparative Example 7

A molded article was prepared and evaluated in the same manner as in Example 1 except that the pellet length of the filament pellet was changed to 7 mm and the composition was changed as shown in Table 3. The evaluation results are summarized in Table 3.

TABLE 1

| | | | | Example 1 | Example 2 | Example 3 | Example 4 | Example 5 | Example 6 |
|---|---|---|---|---|---|---|---|---|---|
| Raw material | Inorganic fiber (A) | Type | — | A | A | A | A | A | A |
| | | Blending amount | Parts by weight | 20.0 | 10.0 | 20.0 | 20.0 | 20.0 | 20.0 |
| | Organic fiber (B) | Type | — | B-1 | B-1 | B-2 | B-4 | B-3 | B-4 |
| | | Blending amount | Parts by weight | 5.0 | 5.0 | 5.0 | 5.0 | 5.0 | 5.0 |
| | | Single yarn tenacity | cN | 35.0 | 35.0 | 30.0 | 150.0 | 45.0 | 150.0 |
| | Thermoplastic resin (C) | Type | — | C-1 | C-1 | C-1 | C-1 | C-2 | C-2 |
| | | Blending amount | Parts by weight | 75.0 | 85.0 | 75.0 | 75.0 | 75.0 | 75.0 |

TABLE 1-continued

|  |  |  |  |  |  |  |  |  |
|---|---|---|---|---|---|---|---|---|
|  | Component (D) | Type | — | D-1 | D-1 | D-1 | D-1 | D-2 | D-2 |
|  |  | Blending amount | Parts by weight | 8.7 | 5.2 | 8.7 | 8.7 | 8.7 | 8.7 |
| Molding material | Length of molding material |  | mm | 8.0 | 8.0 | 8.0 | 8.0 | 8.0 | 8.0 |
| Molded article | Average fiber length | Lwa | mm | 0.5 | 0.6 | 0.5 | 0.6 | 0.6 | 0.6 |
|  |  | Lwb | mm | 5.0 | 5.2 | 4.8 | 7.0 | 5.5 | 6.9 |
|  | Lwb/length of molding material |  | % | 62.5 | 65.0 | 60.0 | 87.5 | 68.8 | 86.3 |
|  | Lwb/Lwa |  | — | 10.0 | 8.7 | 9.6 | 11.7 | 9.2 | 11.5 |
| Evaluation results | Dispersibility |  | — | A | A | A | A | A | A |
|  | Charpy impact strength |  | kJ/m$^2$ | 16.0 | 10.0 | 15.0 | 18.0 | 15.0 | 16.0 |
|  | Flexural strength |  | MPa | 225.0 | 180.0 | 230.0 | 240.0 | 250.0 | 260.0 |
|  | Absorbed energy in falling weight impact test |  | J | 12.0 | 10.0 | 10.0 | 18.0 | 15.0 | 17.0 |
|  | Scattering prevention |  | — | A | B | B | A | B | B |
|  | Moldability |  | — | A | A | A | A | A | A |
|  | Punch absorbed energy |  | — | A | B | B | A | B | A |

|  |  |  |  | Example 7 | Example 8 | Example 9 | Example 10 | Example 11 |
|---|---|---|---|---|---|---|---|---|
| Raw material | Inorganic fiber (A) | Type | — | A | A | A | A | A |
|  |  | Blending amount | Parts by weight | 20.0 | 20.0 | 20.0 | 20.0 | 20.0 |
|  | Organic fiber (B) | Type | — | B-1 | B-3 | B-1 | B-4 | B-1 |
|  |  | Blending amount | Parts by weight | 20.0 | 5.0 | 5.0 | 5.0 | 10.0 |
|  |  | Single yarn tenacity | cN | 35.0 | 45.0 | 35.0 | 150.0 | 35.0 |
|  | Thermoplastic resin (C) | Type | — | C-1 | C-3 | C-1 | C-1 | C-1 |
|  |  | Blending amount | Parts by weight | 60.0 | 75.0 | 75.0 | 75.0 | 70.0 |
|  | Component (D) | Type | — | D-1 | D-2 | D-1 | D-1 | D-1 |
|  |  | Blending amount | Parts by weight | 13.9 | 8.7 | 8.7 | 8.7 | 8.0 |
| Molding material | Length of molding material |  | mm | 8.0 | 8.0 | 14.0 | 14.0 | 8.0 |
| Molded article | Average fiber length | Lwa | mm | 0.5 | 0.6 | 1.1 | 1.1 | 0.7 |
|  |  | Lwb | mm | 4.8 | 5.0 | 11.0 | 13.0 | 4.8 |
|  | Lwb/length of molding material |  | % | 60.0 | 62.5 | 78.6 | 92.9 | 60.0 |
|  | Lwb/Lwa |  | — | 9.6 | 8.3 | 10.0 | 11.8 | 6.9 |
| Evaluation results | Dispersibility |  | — | B | A | B | B | A |
|  | Charpy impact strength |  | kJ/m$^2$ | 20.0 | 10.0 | 20.0 | 22.0 | 22.0 |
|  | Flexural strength |  | MPa | 170.0 | 350.0 | 250.0 | 260.0 | 180.0 |
|  | Absorbed energy in falling weight impact test |  | J | 20.0 | 10.0 | 22.0 | 24.0 | 19.0 |
|  | Scattering prevention |  | — | A | B | A | A | A |
|  | Moldability |  | — | A | A | A | A | A |
|  | Punch absorbed energy |  | — | A | B | A | A | C |

TABLE 2

|  |  |  |  | Example 12 | Example 13 | Example 14 | Example 15 | Example 16 | Example 17 |
|---|---|---|---|---|---|---|---|---|---|
| Raw material | Inorganic fiber (A) | Type | — | A-1 | A-1 | A-1 | A-1 | A-1 | A-1 |
|  |  | Blending amount | Parts by weight | 20.0 | 20.0 | 20.0 | 20.0 | 20.0 | 20.0 |
|  | Organic fiber (B) | Type | — | B-4 | B-4 | B-4 | B-4 | B-1 | B-1 |
|  |  | Blending amount | Parts by weight | 5.0 | 5.0 | 5.0 | 5.0 | 5.0 | 5.0 |
|  |  | Single yarn tenacity | cN | 150.0 | 150.0 | 150.0 | 150.0 | 35.0 | 35.0 |
|  | Thermoplastic resin (C) | Type | — | C-1 | C-1 | C-2 | C-1 | C-1 | C-1 |
|  |  | Blending amount | Parts by weight | 75.0 | 75.0 | 75.0 | 75.0 | 75.0 | 75.0 |
|  | Component (D) | Type | — | D-1 | D-1 | D-2 | D-1 | D-1 | D-1 |
|  |  | Blending amount | Parts by weight | 8.7 | 8.7 | 8.7 | 8.7 | 8.7 | 8.7 |
| Molding material | Length of molding material |  | mm | 8.0 | 8.0 | 8.0 | 14.0 | 8.0 | 19.0 |

TABLE 2-continued

|  |  |  | Example 12 | Example 13 | Example 14 | Example 15 | Example 16 | Example 17 |
|---|---|---|---|---|---|---|---|---|
| Molded article | Average fiber length Lwa | mm | 0.3 | 1.5 | 0.2 | 1.5 | 0.08 | 2.2 |
|  | Lwb | mm | 7.0 | 6.0 | 5.0 | 12.0 | 4.8 | 18.0 |
|  | Lwb/length of molding material | % | 87.5 | 75.0 | 62.5 | 85.7 | 60.0 | 94.7 |
|  | Lwb/Lwa | — | 23.3 | 4.0 | 25.0 | 8.0 | 60.0 | 8.2 |
| Evaluation results | Dispersibility | — | A | A | A | B | A | B |
|  | Charpy impact strength | kJ/m$^2$ | 14.0 | 14.0 | 14.0 | 21.0 | 18.0 | 30.0 |
|  | Flexural strength | MPa | 230.0 | 280.0 | 220.0 | 270.0 | 130.0 | 150.0 |
|  | Absorbed energy in falling weight impact test | J | 16.0 | 15.0 | 13.0 | 20.0 | 19.0 | 17.0 |
|  | Scattering prevention | — | A | B | B | A | A | A |
|  | Moldability | — | A | A | A | A | A | B |
|  | Punch absorbed energy | — | A | C | A | C | A | B |

TABLE 3

|  |  |  |  | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|---|---|
| Raw material | Inorganic fiber (A) | Type | — | A-1 | A-1 | — | A-1 | A-1 | A-1 | A-1 |
|  |  | Blending amount | Parts by weight | 20.0 | 50.0 | 0.0 | 20.0 | 20.0 | 20.0 | 20.0 |
|  | Organic fiber (B) | Type | — | — | B-1 | B-1 | B-1 | B-1 | B-1 | B-1 |
|  |  | Blending amount | Parts by weight | 0.0 | 5.0 | 10.0 | 5.0 | 5.0 | 5.0 | 10.0 |
|  |  | Single yarn tenacity | cN | — | 35.0 | 35.0 | 35.0 | 35.0 | 35.0 | 35.0 |
|  | Thermoplastic resin (C) | Type | — | C-1 | C-1 | C-1 | C-1 | C-1 | C-1 | C-1 |
|  |  | Blending amount | Parts by weight | 80.0 | 45.0 | 90.0 | 75.0 | 75.0 | 75.0 | 70.0 |
|  | Component (D) | Type | — | D-1 | D-1 | D-1 | D-1 | D-1 | D-1 | D-1 |
|  |  | Blending amount | Parts by weight | 7.0 | 19.1 | 3.5 | 8.7 | 8.7 | 8.7 | 8.0 |
| Molding material | Length of molding material | mm |  | 8.0 | 8.0 | 8.0 | 8.0 | 25.0 | 20.0 | 7.0 |
| Molded article | Average fiber length | Lwa | mm | 0.6 | 0.4 | — | 0.2 | — | — | 1.2 |
|  |  | Lwb | mm | — | 4.1 | 4.5 | 2.5 | — | — | 2.4 |
|  | Lwb/length of molding material | % |  | — | 51.3 | 56.3 | 31.3 | — | — | 34.3 |
|  | Lwb/Lwa | — |  | — | 10.3 | — | 12.5 | — | — | 2.0 |
| Evaluation results | Dispersibility | — |  | A | C | B | A | — | — | A |
|  | Charpy impact strength | kJ/m$^2$ |  | 8.0 | 8.0 | 5.0 | 7.0 | — | — | 23.0 |
|  | Flexural strength | MPa |  | 238.0 | 290.0 | 98.0 | 105.0 | — | — | 193.0 |
|  | Absorbed energy in falling weight impact test | J |  | 4.5 | 9.0 | 2.3 | 4.0 | — | — | 17.0 |
|  | Scattering prevention | — |  | C | C | B | C | — | — | C |
|  | Moldability | — |  | A | A | A | A | B | B | A |
|  | Punch absorbed energy | — |  | D | B | B | B | — | — | D |

In the materials of Examples 1 to 17, the inorganic fibers (A), the organic fibers (B) and the component (D) were present in the molded article, and exhibited high flexural strength and impact properties. On the other hand, in Comparative Example 1, since the organic fibers (B) were not contained, it results in weak fiber reinforcing effect, low impact properties, and also low scattering prevention of the molded article. In Comparative Example 2 in which the content of the inorganic fibers (A) was increased, since the inorganic fibers (A) were entangled with each other and fiber dispersibility in the molded article was poor, it results in low impact properties, and also low scattering prevention of the molded article. In Comparative Example 3, since the inorganic fibers (A) were not contained, it results in low impact properties, and also low scattering prevention of the molded article. In Comparative Example 4, the fiber length of the organic fibers (B) became too short by increasing the back pressure during molding, thus it results in low impact properties and also low scattering prevention of the molded article. In Comparative Examples 5 and 6, since the pellet length of the filament pellet was increased, the pellet did not bite into the screw of the injection molding machine and could not be molded. In Comparative Example 7 in which the pellet length of the filament pellet was shortened, it results in also low scattering preventions of the molded article.

INDUSTRIAL APPLICABILITY

Applications of the molded article and molding material include automotive parts such as instrument panels, door beams, underside covers, spare tire covers, front ends, structural members, and internal parts; parts of home and office electrical appliances such as telephones, facsimiles, VTRs, copying machines, televisions, microwave ovens, audio equipment, toiletry goods, "LASER DISC (registered trademark),'' refrigerators, and air-conditioners; and members for use in electrical and electronic equipment, represented by housings used for personal computers and cellular phones, keyboard supports for supporting a keyboard in a personal computer; and the like. Among these, since it is excellent also in fragment scattering preventing properties when a large molded article is destroyed, it is suitably used for molded articles such as large molded articles, especially door lower garnishes and door inner panels.

The invention claimed is:

1. A fiber reinforced thermoplastic resin molded article comprising inorganic fibers (A), organic fibers (B), and a thermoplastic resin (C), wherein
the inorganic fibers (A) are carbon fibers,
the fiber reinforced thermoplastic resin molded article comprises 5 to 45 parts by weight of the inorganic fibers (A), 1 to 45 parts by weight of the organic fibers (B), and 10 to 94 parts by weight of the thermoplastic resin (C), based on 100 parts by weight of a total of the inorganic fibers (A), the organic fibers (B), and the thermoplastic resin (C), and
the inorganic fibers (A) in the fiber reinforced thermoplastic resin molded article have a weight average fiber length ($L_{wa}$) of 0.05 mm or more and 2.5 mm or less, the organic fibers (B) have a weight average fiber length ($L_{wb}$) of more than 4 mm and 20 mm or less, and the weight average fiber length ($L_{wa}$) of the inorganic fibers (A) and the weight average fiber length ($L_{wb}$) of the organic fibers (B) satisfy:

$8 << 30$.

2. The fiber reinforced thermoplastic resin molded article according to claim 1, wherein the inorganic fibers (A) have the weight average fiber length ($L_{wa}$) of 0.5 mm or more and 2.5 mm or less.

3. The fiber reinforced thermoplastic resin molded article according to claim 1, wherein the content of the organic fibers (B) is 1 to 10 parts by weight based on 100 parts by weight of a total of the inorganic fibers (A), the organic fibers (B), and the thermoplastic resin (C).

4. The fiber reinforced thermoplastic resin molded article according to claim 1, wherein the organic fibers (B) are at least one selected from the group consisting of polyamide fibers, polyester fibers, polyarylene sulfide fibers, and fluorine resin fibers.

5. The fiber reinforced thermoplastic resin molded article according to claim 1, wherein the thermoplastic resin (C) is at least one selected from the group consisting of polypropylene resins, polyamide resins, polycarbonate resins, and polyarylene sulfide resins.

6. A fiber reinforced thermoplastic resin molding material comprising inorganic fibers (A), organic fibers (B), a thermoplastic resin (C), and a component (D) having a melt viscosity at 200° C. lower than that of the thermoplastic resin (C), wherein
the inorganic fibers (A) are carbon fibers,
the fiber reinforced thermoplastic resin molding material comprises 5 to 45 parts by weight of the inorganic fibers (A), 1 to 45 parts by weight of the organic fibers (B), 10 to 93 parts by weight of the thermoplastic resin (C), and 1 to 20 parts by weight of the component (D), based on 100 parts by weight of a total of the inorganic fibers (A), the organic fibers (B), the thermoplastic resin (C), and the component (D),
the inorganic fibers (A) and the organic fibers (B) are arranged almost parallel to an axial direction,
lengths of the inorganic fibers (A) and the organic fibers (B) and a length of the fiber reinforced thermoplastic resin molding material are substantially equal to each other, and
a length in a longer direction of the fiber reinforced thermoplastic resin molding material is 8 mm to 14 mm.

7. The fiber reinforced thermoplastic resin molding material according to claim 6, wherein the organic fibers (B) are at least one selected from the group consisting of polyamide fibers, polyester fibers, polyarylene sulfide fibers, and fluorine resin fibers.

8. The fiber reinforced thermoplastic resin molding material according to claim 6, wherein a single yarn tenacity of the organic fibers (B) is 30 cN or more.

9. The fiber reinforced thermoplastic resin molding material according to a claim 6, wherein the thermoplastic resin (C) is at least one selected from the group consisting of polypropylene resins, polyamide resins, polycarbonate resins, and polyarylene sulfide resins.

10. A fiber reinforced thermoplastic resin molding material comprising inorganic fibers (A), organic fibers (B), a thermoplastic resin (C), and a component (D) having a melt viscosity at 200° C. lower than that of the thermoplastic resin (C), composed of multiple different pellets, wherein
the inorganic fibers (A) are carbon fibers,
the fiber reinforced thermoplastic resin molding material comprises 5 to 45 parts by weight of the inorganic fibers (A), 1 to 45 parts by weight of the organic fibers (B), 10 to 93 parts by weight of the thermoplastic resin (C), and 1 to 20 parts by weight of the component (D), based on 100 parts by weight of a total of the inorganic fibers (A), the organic fibers (B), the thermoplastic resin (C), and the component (D),
the multiple different pellets including a pellet (x) containing the inorganic fibers (A), the thermoplastic resin (C), and the component (D), and a pellet (y) containing the organic fibers (B), a thermoplastic resin (F), and a component (G),
the inorganic fibers (A) are arranged almost parallel to an axial direction of the pellets (x), and the organic fibers (B) are arranged almost parallel to an axial direction of the pellets (y),
lengths of the inorganic fibers (A) and the pellets (x) are substantially equal to each other, and lengths of the organic fibers (B) and the pellets (y) are substantially equal to each other, and
lengths in a longer direction of the pellets (x) and the pellets (y) are 8 mm to 14 mm.

* * * * *